US 11,343,196 B2

(12) United States Patent
Hirota

(10) Patent No.: US 11,343,196 B2
(45) Date of Patent: May 24, 2022

(54) PACKET RELAYING APPARATUS AND PACKET RELAYING METHOD

(71) Applicant: FUJITSU LIMITED, Kawasaki (JP)

(72) Inventor: Masaki Hirota, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 17/107,691

(22) Filed: Nov. 30, 2020

(65) Prior Publication Data

US 2021/0168087 A1    Jun. 3, 2021

(30) Foreign Application Priority Data

Dec. 2, 2019    (JP) .............................. JP2019-218099

(51) Int. Cl.
*H04L 47/32*    (2022.01)
*H04L 43/0894*    (2022.01)
*H04L 47/28*    (2022.01)

(52) U.S. Cl.
CPC .......... *H04L 47/32* (2013.01); *H04L 43/0894* (2013.01); *H04L 47/28* (2013.01)

(58) Field of Classification Search
None
See application file for complete search history.

(56) References Cited

U.S. PATENT DOCUMENTS

| 2003/0039254 | A1  | 2/2003  | Ohnishi |
|---|---|---|---|
| 2003/0202525 | A1  | 10/2003 | Nagatomo |
| 2016/0127250 | A1* | 5/2016  | McCormick .......... H04L 43/062 370/235 |
| 2019/0104073 | A1* | 4/2019  | Choi ..................... H04W 28/06 |
| 2020/0213240 | A1* | 7/2020  | Gotz ................... H04L 47/6275 |

FOREIGN PATENT DOCUMENTS

| JP | 2003-069603 A | 3/2003 |
|---|---|---|
| JP | 2003-318964 A | 11/2003 |
| JP | 2018-129661 A | 8/2018 |

* cited by examiner

*Primary Examiner* — Anh Ngoc M Nguyen
(74) *Attorney, Agent, or Firm* — Fujitsu Patent Center

(57) ABSTRACT

A packet processing apparatus sets, for each TS as a gate state of each of a first gate and a second gate, a priority state, a normal state, and a mixed state and sets a predetermined TS associated with a cyclic pattern of the first packet to the priority or the mixed state. The apparatus allocates, when an amount of output delay of the first packet that is in the mixed state in the predetermined TS is within an allowable amount, the first packet and the second packet to the predetermined TS. The apparatus sets output timing of the first packet allocated in the predetermined TS to the priority state and sets output timing of the second packet allocated in the predetermined TS to the normal state.

7 Claims, 23 Drawing Sheets

FIG.4

| TS NUMBER (26A) | FIRST GATE (26B) | SECOND GATE (26C) | RETAINING TIME (26D) |
|---|---|---|---|
| 1 | O | C | 10 μs |
| 2 | O | C | 20 μs |
| 3 | O | C | 10 μs |
| 4 | O | O | 5 μs |
| 5 | O | O | 5 μs |
| 6 | O | O | 15 μs |
| ⋮ | ⋮ | ⋮ | ⋮ |
| X | O | O | 15 μs |

FIG.5

| TS NUMBER | FIRST GATE | SECOND GATE | RETAINING TIME |
|---|---|---|---|
| 1 | O | C | 10 μs |
| 2 | O | C | 20 μs |
| 3 | O | O/C | 10 μs |
| 4 | O | C | 10 μs |
| 5 | O | O/C | 10 μs |
| 6 | O | O | 10 μs |
| 7 | O | O | 15 μs |
| ⋮ | ⋮ | ⋮ | ⋮ |
| X | O | O | 10 μs |

PACKET RELAYING APPARATUS AND PACKET RELAYING METHOD

CROSS-REFERENCE TO RELATED APPLICATION

This application is based upon and claims the benefit of priority of the prior Japanese Patent Application No. 2019-218099, filed on Dec. 2, 2019, the entire contents of which are incorporated herein by reference.

FIELD

The embodiments discussed herein are related to a packet processing apparatus and a packet processing method.

BACKGROUND

In the fifth generation mobile communication system (5G), for example, providing new services, such as "ultra-high speed", "ultra-multiple connection", and "ultra-low delay", is expected. Furthermore, in 5G, because there is a demand for implementing an end-to-end service by integrating wired sections and wireless sections, various kinds of requirements are imposed on communication devices in the wired sections. From among these requirements, "ultra-low delay" is an index that is not conventionally present and a request imposed on the communication devices in the wired section connected to the wireless section is large.

One of reasons for requesting ultra-low delay is, for example, retransmission control (hybrid automatic repeat request (HARQ)) of the radio layer. HARQ is a protocol operating in the MAC layer between, for example, smart phones (user equipment (UE)) and a base station, and a delay requirement for sending back an ACK response within 4 milliseconds after data transmission is stated. Conventionally, HARQ is a closed requirement in a wireless area. Furthermore, centralized radio access network (C-RAN) in which a base station is split into a baseband function (CU: central unit, DU: distributed unit) and an antenna (RU: remote unit) is becoming widely used. However, with the popularization of C-RAN, new wired sections between RUs and base stations are also included in the target range of the delay requirements. Accordingly, in the MPH system standard, such as Institute of Electrical and Electronics Engineers (IEEE) 802.1CM and IEEE 1914.1, a delay requirement within 100 us is prescribed.

In contrast, regarding 5G Mobile Front Haul (MFH), replacement from Common Public Radio Interface (CPRI) to eCPRI is progressed and, in the future, ether packets are assumed to be the mainstream traffic of MPH. Consequently, MPH can be shared with other access networks, and thus, in MFH, IoT and wired Internet traffic are expected to be congested. Namely, in MPH in 5G, there is a demand for improving transmission efficiency of low priority packets, such as wired Internet, while guaranteeing a low delay with respect to high priority packets of smart phones. Thus, IEEE 802.1Qbv (Time Aware Shaper: TAS) that is the low delay standard and that can meet the subject requirements has been drawing attention.

TAS is a technology for reducing packet collision delay. The collision delay is a delay in which, when two packets almost simultaneously arrives at a switch, even if the second arrived packet is a high priority packet, the second arrived packet needs to wait until the output of the first arrived packet has been completed. In TAS technology, a gate that outputs high priority packets and a gate that outputs low priority packets are arranged at an exit of queues. Then, TAS tries to avoid a collision between a high priority packet and a low priority packet by closing the gate that outputs the low priority packet at the timing at which the high priority packet arrives.

Therefore, the present inventor proposes a packet processing apparatus that includes a plurality of storage units, an opening-closing unit, a collecting unit, an analyzing unit, and a control unit. Each of the storage units stores therein reception packets for each type of the reception packets, such as, high priority packets and low priority packets. The opening-closing unit opens and closes and output of each of the storage units. The collecting unit collects the flow rate of the packets for each time slot of the reception packets. The analyzing unit specifies a cyclic pattern of the reception packets based on the flow rate of the packets for each time slot of the reception packets. The control unit specifies, based on the cyclic pattern of the specified reception packets, a time slot section from which the high priority packets are output with priority, and perform control of opening and closing of each of the opening-closing units related to the specified time slot section. As a result, it is possible to suppress output delays of high priority packets.

Patent Document 1: Japanese Laid-open Patent Publication No. 2018-129661

Patent Document 2: Japanese Laid-open Patent Publication No. 2003-318964

With the packet processing apparatus, at the time of output of the high priority packets with priority, by setting the output gate of the high priority packets to an open state and by setting the output gate of the low priority packets to the closed state, the high priority packets are output with priority. The high priority packets do not arrive at all of the sections in the priority output section for the high priority packets; therefore, an empty section from which a high priority packet is not output is present in the priority output section. However, even in the empty section in the priority output section, the output gate for the low priority packets is in a closed state. Thus, even if a low priority packet arrives, the empty section is not able to output the low priority packet. Consequently, an output opportunity of the low priority packet is reduced and an output delay of the low priority packet occurs.

SUMMARY

According to an aspect of an embodiment, a packet processing apparatus connects a distributed station and a central station by wire communication. The packet processing apparatus includes a first gate, a second gate and a processer. The first gate opens and closes output of a first packet in which low delay is requested as compared to a second packet in the wire communication, with respect to the wire communication for each time slots in a subframe. The second gate opens and closes output of the second packet with respect to the wire communication for each of the time slots in the subframe. The processor is configured to learn, from a flow rate of the first packet, a cyclic pattern of the first packet for each of the time slots in the subframe in a predetermined cycle. The processor is configured to set, for each of the time slots as a gate state of each of the first gate and the second gate, a priority state in which the first packet is output with priority, a normal state in which the first packet or the second packet is alternatively output, or a mixed state in which the normal state and the priority state are present in a mixed manner, and set, as a gate state of a predetermined time slot associated with the cyclic pattern, the priority state or the mixed state. The processor is configured to monitor a flow rate of each of the first packet and the second packet in the predetermined time slot that is set in the mixed state. The processor is configured to determine, from a monitoring result obtained from the monitoring, whether an amount of output delay of the first packet at the time of outputting the first packet and the second packet in the predetermined time slot is within an allowable amount. The processor is configured to allocate, when the amount of output delay of the first packet is within the allowable amount, the first packet and the second packet to the predetermined time slot. The processor is configured to set the gate state at output timing of the first packet allocated in the predetermined time slot to the priority state and set the gate state at output timing of the second packet allocated in the predetermined time slot to the normal state.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 4 is a diagram illustrating an example of a configuration of a list table;

FIG. 5 is a diagram illustrating an example of a configuration of the list table related to output of non-MPH packets at the time of output of MFH packets with priority;

DESCRIPTION OF EMBODIMENTS

Preferred embodiments of the present invention will be explained with reference to accompanying drawings. Furthermore, the disclosed technology is not limited to each of the embodiments. Furthermore, the embodiments described below may also be used in any appropriate combination as long as the embodiments do not conflict with each other.

Figure 23:
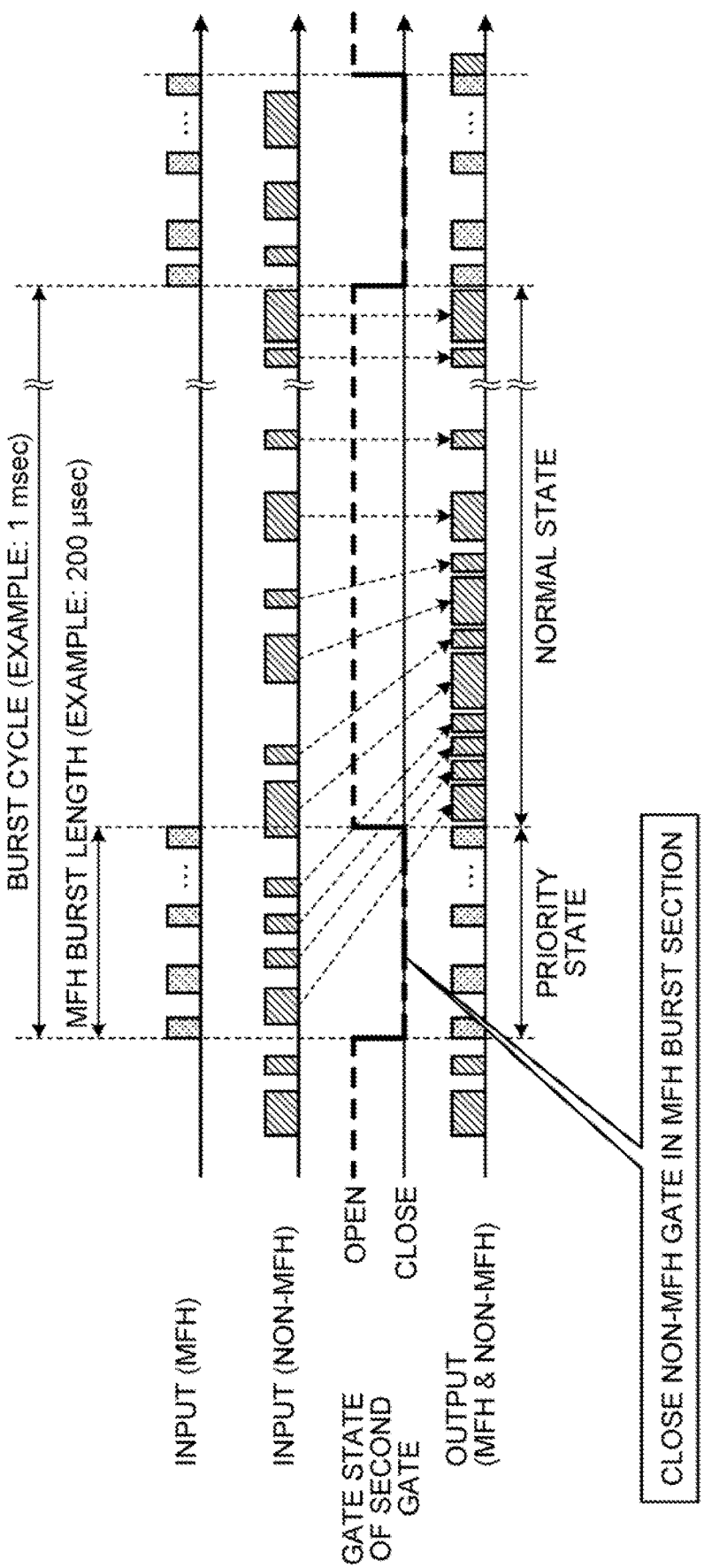
FIG. 23 is a diagram illustrating an example of a steady monitoring process at the time of an MFH priority output as a comparative example.

FIG. 23 is a diagram illustrating an example of a steady monitoring process at the time of output of MFH with priority as a comparative example. The packet processing apparatus includes a first gate that opens and closes output of a high priority packet, such as an MH packet, and a second gate that opens and closes output of a low priority packet, such as a non-MFH packet that is a mobile backhaul (MBH) packet. The packet processing apparatus collects the flow rate of MPH packets for each time slot (TS) included in a subframe. The packet processing apparatus specifies a cyclic pattern of MFH packets based on the flow rate of the MPH packets for each TS. Based on the specified cyclic pattern of the MFH packets, the packet processing apparatus specifies a TS section from which the MPH packets are output with priority, and then performs control of opening and closing each of the first gate and the second gate in the specified TS section.

The packet processing apparatus sets, in accordance with the cyclic pattern of the MPH packets, the gate state of each of the TS sections in a burst section for the MPH packets to a priority state, in which, for example, the gate state of the first gate is set to an open state and the gate state of the second gate is set to a closed state. Consequently, in the subject TS section, the MPH packets are output with priority. Furthermore, the packet processing apparatus sets the gate state of the TS section other than the burst section for the MPH packets to a normal state, in which, for example, the gate state of each of the first gate and the second gate is set to an open state. In the subject TS section, MPH packets and non-MFH packets are alternatively output. Namely, in the packet processing apparatus, as illustrated in FIG. 23, the non-MPH packets that arrived in the priority state are not output but are output in a normal state after the priority state is switched to the normal state.

In the packet processing apparatus that is in the priority state, the gate state of the second gate is in the closed state regardless of the density or an interval of MPH packets, or the packet length of a non-MFH packet. Accordingly, the packet processing apparatus that is in the priority state is not able to output a non-MPH packet even if the non-MPH packet arrives. Furthermore, in the packet processing apparatus that is in the priority state, an output opportunity of the non-MFH packets is reduced from the viewpoint of outputting all of the packets, and thus, an output delay of the non-MFH packets occurs. Furthermore, although a low delay is requested for the MPH packets as compared with the non-MPH packets, the MPH packet is not always needed to be output immediately if an amount of output delay of the MPH packets is within an allowable range.

Thus, the present inventor proposes the packet processing apparatus according to a first embodiment that can efficiently output MPH packets and non-MFH packets while suppressing output delays of the MPH packets and the non-MFH packet.

[a] First Embodiment

Figure 1:
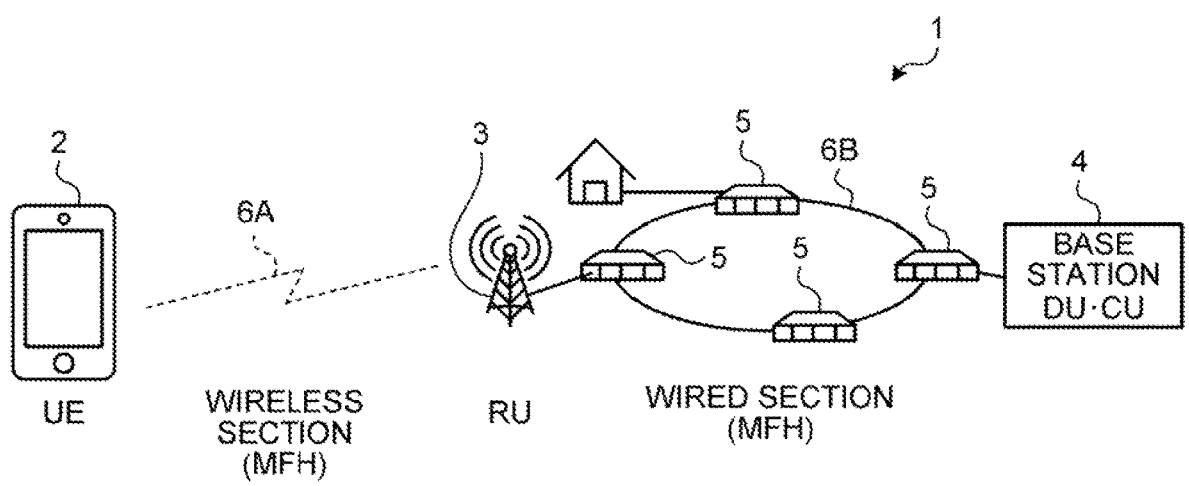
FIG. 1 is a diagram illustrating an example of a communication system according to a first embodiment.

FIG. 1 is a diagram illustrating an example of a communication system 1 according to a first embodiment. The communication system 1 illustrated in FIG. 1 is a 5G communication system that includes a user equipment (UE) 2, a remote unit (RU) 3, a base station 4, packet processing apparatuses (packet switches) 5. The UE 2 is, for example, a terminal device, such as a 5G smart phone. The RU 3 is a distributed station, such as a 5G antenna, that connects a plurality of the UEs 2 by wireless communication using, for example, a dynamic TDD method. The base station 4 is a central station that includes, for example, a distributed unit (DU) and a central unit (CU) and that connects the plurality of the RUs 3 by wire communication using, for example, a full duplex communication method. Each of the packet processing apparatuses 5 is a packet switch that connects the RU 3 by wire communication using the full duplex communication method and that connects the base station 4 by wire communication using the full duplex communication method. The area between the UE 2 and the RU 3 is a wireless section 6A of mobile front haul (MFH) in which a connection is established by wireless communication using, for example, the dynamic TDD method. The area between the RU 3 and the base station 4 is a wired section 6B in which a connection is established by wire communication using the full duplex communication method via the packet processing apparatuses 5. Each of the packet processing apparatuses 5 transmits a first packet corresponding to a high priority packet and a second packet corresponding to a low priority packet in the wired section 6B. The first packet is an MFH packet, whereas the second packet is a non-MFH packet, such as an MBH packet. The MFH packet is a packet in which a low delay is requested as compared with the non-MFH packet.

Figure 2:
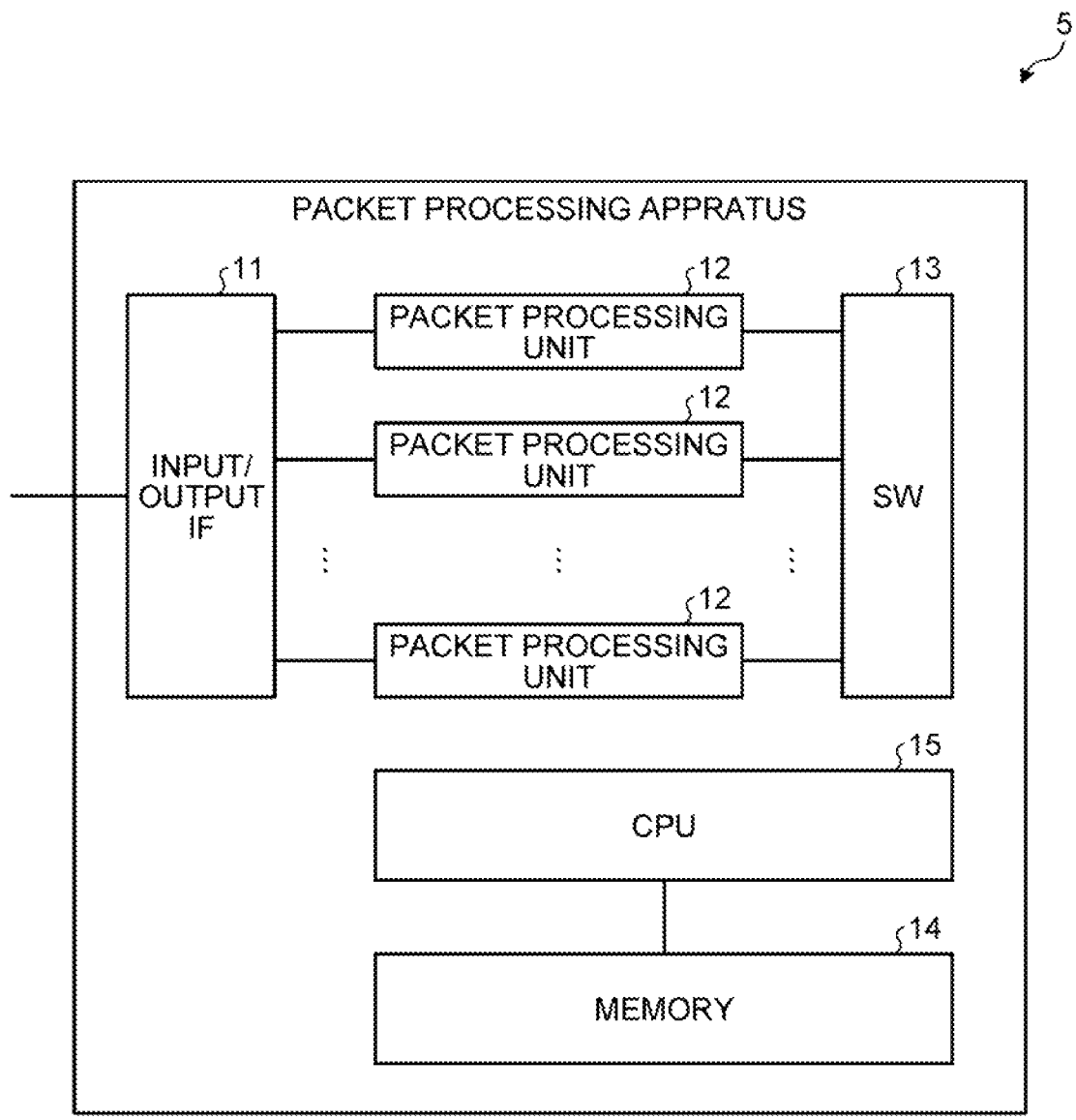
FIG. 2 is a diagram illustrating an example of a hardware configuration of a packet processing apparatus.

FIG. 2 is a diagram illustrating an example of a hardware configuration of the packet processing apparatus 5. The packet processing apparatus 5 illustrated in FIG. 2 includes an input/output interface (IF) 11, a plurality of packet processing units 12, a switch (SW) 13, a memory 14, and a central processing unit (CPU) 15. The input/output IF 11 is an interface for connecting various lines, such as backbone lines and inputting/outputting packets. The input/output IF 11 is an interface for connecting the RU 3, the base station 4, and other packet processing apparatuses 5 connected to, for example, backbone lines. The packet processing unit 12 performs packet processing using a TAS method. The SW 13 is a switch for switching input and output of the packet processing unit 12. The memory 14 is an area in which various kinds of information are stored. The CPU 15 performs overall control of the packet processing apparatus 5.

Figure 3:
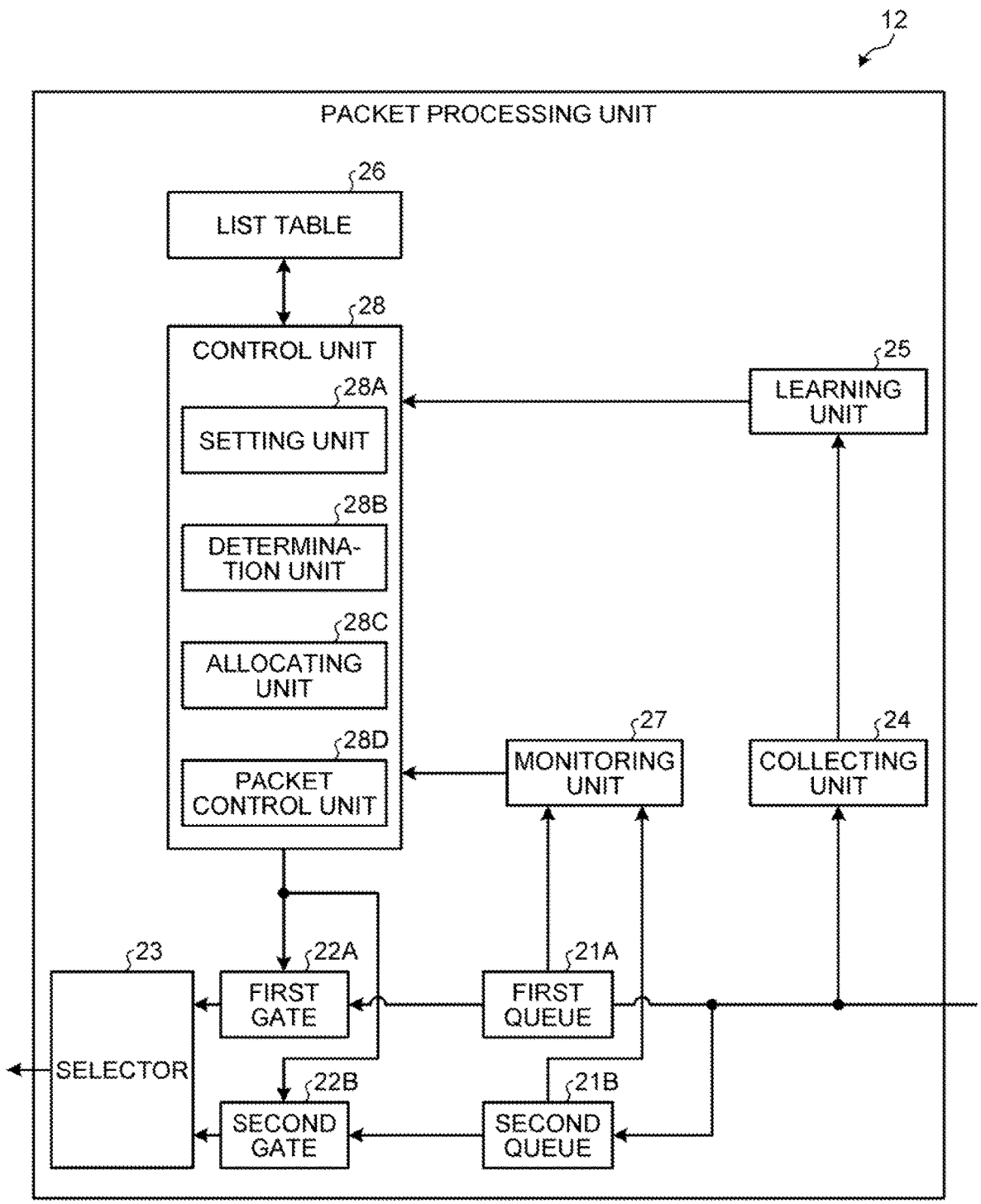
FIG. 3 is a diagram illustrating an example of a configuration of a packet processing unit according to the first embodiment.

FIG. 3 is a diagram illustrating an example of a configuration of the packet processing unit 12 according to the first embodiment. The packet processing unit 12 illustrated in FIG. 3 includes a first queue 21A, a second queue 21B, a first gate 22A, a second gate 22B, and a selector 23. The packet processing unit 12 includes a collecting unit 24, a learning unit 25, a list table 26, a monitoring unit 27, and a control unit 28. Furthermore, the control unit 28 includes a setting unit 28A, a determination unit 28B, an allocating unit 28C, and a packet control unit 28D.

The first queue 21A is a storage unit that performs queueing on MFH packets from among arriving reception packets. The first queue 21A identifies P bits in a VLAN tag in the reception packets and performs queueing on the MPH packets based on the identification result when the reception packets are the MPH packets. The first queue 21A deletes the MFH packets in units of packets from the first queue 21A at the timing at which, for example, the MPH packets are output from the first gate 22A in units of packets. The second queue 21B is a storage unit that performs queueing on non-MFH packets, such as, for example, MBH packets included in the arriving reception packets. The second queue 21B identifies P bits in the VLAN tag in the reception packets and performs queueing on the non-MFH packets based on the identification result when the reception packets are the non-MFH packets. The second queue 21B deletes the non-MPH packets in units of packets from the second queue 218 at the timing at which, for example, the non-MPH packets are output from the second gate 22B in units of packets. Consequently, by outputting the MPH packets with priority, it is possible to suppress an output delay of the MFH packet by avoiding a conflict with the non-MFH packet.

The first gate 22A opens and closes output of the MFH packets included in the first queue 21A. The second gate 22B opens and closes an output of the non-MFH packets included in the second queue 21B. The selector 23 selectively outputs the first gate 22A or the second gate 22B. When the gate state of each of the first gate 22A and the second gate 228 is in a priority state, because the gate state of the first gate 22A is in an open state and the gate state of the second gate 22B is in a closed state, the selector 23 outputs the MFH packets with priority. Furthermore, when the gate state of each of the first gate 22A and the second gate 22B is a normal state, because the gate state of each of the first gate 22A and the second gate 22B is in an open state, the selector 23 alternatively outputs the MFH packets or the non-MFH packets.

The collecting unit 24 collects the flow rate of the reception packets for each time zone. Furthermore, the flow rate of the packets is the number of packets or the number of bytes for each time slot (TS) in, for example, a subframe. The monitoring unit 27 monitors the flow rate of the MFH packets and the flow rate of the non-MFH packets for each time zone.

The learning unit 25 analyzes the flow rate of the MPH packets for each TS in the subframe and analyzes the cyclic pattern of the MFH packets. The learning unit 25 updates the content of the list table 26 based on the analysis result obtained by the learning unit 25.

FIG. 4 is a diagram illustrating an example of a configuration of the list table 26. The list table 26 illustrated in FIG. 4 manages a TS number 26A, a gate state 26B of the first gate 22A, a gate state 26C of the second gate 22B, and retaining time 26D by associating these items with each other. The TS number 26A is the number that is used to identify the TS of each of the reception packets. The gate state 26B of the first gate 22A is gate open/close information indicating an open state (O) or a closed state (C) of the first gate 22A. The gate state 26C of the second gate 22B is gate open/close information indicating an open state or a closed state of the second gate 22B. The retaining time 26D is allocation time for the TS number 26A. The TS number 26A can appropriately be changed in the range of 1 to X. The gate state 26B of the first gate 22A and the gate state 26C of the second gate 22B can also appropriately be changed for each of the TS numbers 26A. The retaining time 26D can also appropriately be changed for each of the TS numbers 26A.

The setting unit 28A in the control unit 28 refers to the list table 26 and sets the gate state of the TS number "1" to the first gate 22A and the second gate 22B at the timing of the TS number "1". Then, the setting unit 28A sets the gate state of the TS number "2" to the first gate 22A and the second gate 22H at the timing of the TS number "2". Furthermore, the setting unit 28A sequentially sets each of the gate states to the first gate 22A and the second gate 22B at the timing of each of the TS numbers from "3" to "N". Then, after the setting unit 28A sets the gate state of the TS number "N", the setting unit 28A returns to the TS number "1", again sets the gate state of the TS number "1", and sequentially sets the gate state at the timing of each of the TS numbers from "2" to "N". Namely, the setting unit 28A refers to the list table 26 and cyclically, repeatedly, and sequentially sets the gate state at the timing of each of the TS numbers from "1" to "X" to the first gate 22A and the second gate 22B.

The control unit 28 updates the content of the list table 26 based on the analysis result obtained by the learning unit 25. The control unit 28 updates TS numbers and the retaining time of each of the TS numbers in the list table 26 based on the cyclic pattern of the reception packets. Furthermore, the control unit 28 updates, based on the cyclic pattern, the gate state of each of the first gate 22A and the second gate 22B in the list table 26 for each TS number. Furthermore, the gate state indicates an open/closed state of each of the first gate 22A and the second gate 22B indicating, for example, an open state and a closed state. Furthermore, because an MFH packet is a high priority packet and a non-MFH packet is a low priority packet, the control unit 28 allows the first gate 22A to be always in an open state and allows the second gate 22B to be in an open or closed state in units of TSs. When the first gate 22A is in an open state, the first gate 22A outputs the MPH packet held by the first queue 21A. When the second gate 22B is in the open state, the second gate 22B outputs the non-MPH packet held by the second queue 21B. When the second gate 22B is in the closed state, the second gate 22B outputs the MPH packet held by the first queue 21A while stopping an output of the non-MFH packet held by the second queue 21B.

When the gate state of each of the first gate 22A and the second gate 22B is in a priority state, the control unit 28 sets the first gate 22A to the open state and sets the second gate 22B to the closed state. The selector 23 outputs, with priority, the MPH packet held by the first queue 21A. Furthermore, when the gate state of each of the first gate 22A and the second gate 22B is in the normal state, the control unit 28 sets the first gate 22A and the second gate 22B to be in an open state. The selector 23 alternatively outputs the MPH packet or the non-MPH packet. When the gate state of each of the first gate 22A and the second gate 22B is in a mixed state, the control unit 28 can switch the gate state of the first gate 22A to the open state and can switch the gate state of the second gate 22B to the open or the closed state. Because the first gate 22A is always in the open state, when the second gate 22B is in the closed state, the selector 23 outputs the MPH packet with priority, whereas when the second gate 22B is the open state, the selector 23 alternatively outputs the MPH packet or the non-MFH packet.

The setting unit 28A sets, for each TS and as the gate state of each of the first gate 22A and the second gate 22B, the priority state in which the MPH packet is output with priority, the normal state in which the MPH packet or the non-MFH packet is alternatively output, the mixed state in which the normal state and the priority state are present in a mixed manner. The setting unit 28A sets the gate state of the predetermined TS associated with the cyclic pattern of the MFH packet to the priority state or the mixed state.

FIG. 5 is a diagram illustrating an example of a configuration of the list table 26 related to output of the non-MFH packets at the time of output of MPH packets with priority. In the list table 26 illustrated in FIG. 5, the gate state 26C of the second gate 22B having the TS number of "1", "2", and "4" is in the closed state indicated by "C", and the gate state 26C of the second gate 22B having the TS number of "6" and "7" is in the open state indicated by "O". Furthermore, the gate state 26C of the second gate 22B having the TS number of "3" and "5" is an open/closed state indicated by "O/C". Namely, because the gate state of the first gate 22A is always in the open state, when the gate state 26C of the second gate 22B is indicated by "C", the control unit 28 recognizes that the gate state of each of the first gate 22A and the second gate 22B in a target TS is in the priority state. Furthermore, when the gate state 26C of the second gate 22B is indicated by "O", the control unit 28 recognizes that the gate state of each of the first gate 22A and the second gate 22B in a target TS is in the normal state. Furthermore, when the gate state 26C of the second gate 22B is indicated by "O/C", the control unit 28 recognizes that the gate state of each of the first gate 22A and the second gate 22B in the target TS is in the mixed state.

The monitoring unit 27 monitors the flow rate of the MPH packets and the non-MPH packets in a predetermined TS that is set to the mixed state. The predetermined TS that is set to the mixed state is a TS that can handle the cyclic pattern of the MPH packets. The monitoring unit 27 calculates, from the flow rate of the MPH packets and the non-MH packets included in the predetermined TS that is set to the mixed state, already output time of the packets that have already been output included in the predetermined TS. Furthermore, based on the flow rate of the MPH packets that are being retained in the first queue 21A in the predetermined TS that is set to the mixed state, the monitoring unit 27 calculates output time, i.e., retaining output time, needed to output the MPH packets that are being retained in the predetermined TS. Furthermore, based on the flow rate of the non-MFH packets that are being retained in the second queue 21B in the predetermined TS that is set to the mixed state, the monitoring unit 27 calculates output time, i.e., remaining amount output time, needed to output the non-MPH packets that are being retained in the predetermined TS.

The determination unit 28B determines whether the total output time of the already output time, the retaining output time, the remaining amount output time, and the margin time in the predetermined TS that is set to the mixed state is within the maximum output time. Furthermore, the maximum output time is the time capable of outputting packets in the predetermined TS to the maximum. Namely, when the total output time is within the maximum output time, the determination unit 28B determines that both of the MFH packets and the non-MFH packets can be output in the predetermined TS that is set to the mixed state. Then, when the total output time is within the maximum output time, the determination unit 28B determines whether the output delay time of the MPH packets corresponding to the remaining amount output time is within an allowable value.

The allocating unit 28C allocates, when an amount of output delay of the MPH packets is within an allowable value, the MPH packets and the non-MPH packets to the predetermined TS that is set to the mixed state. The packet control unit 28D sets the gate state of each of the first gate 22A and the second gate 22B at the output timing of the MPH packets allocated in the predetermined TS, which is set in the mixed state, to the priority state. Furthermore, the packet control unit 28D sets the gate state of the output timing of the non-MFH packets allocated in the predetermined TS, which is set in the mixed state, to the normal state.

The learning unit 25 performs a cycle determination process of specifying a cyclic pattern of the MPH packets from the burst section of the MPH packets. The setting unit 28A in the control unit 28 performs a close TS decision process of setting the gate state for each TS number from the cyclic pattern of the MPH packets. Furthermore, the gate state corresponds to the gate state of each of the first gate 22A and the second gate 22B, such as the priority state, the normal state, and the mixed state. The packet control unit 28D in the control unit 28 performs a steady monitoring process of performing control of, based on the gate state for each TS number in the list table 26, opening and closing output of the first gate 22A or the second gate 22B related to the currently operated service. Furthermore, it is assumed that the steady monitoring process includes a process of adjusting, for example, clock deviation and timing lag of an arrival of a packet.

Figure 6:
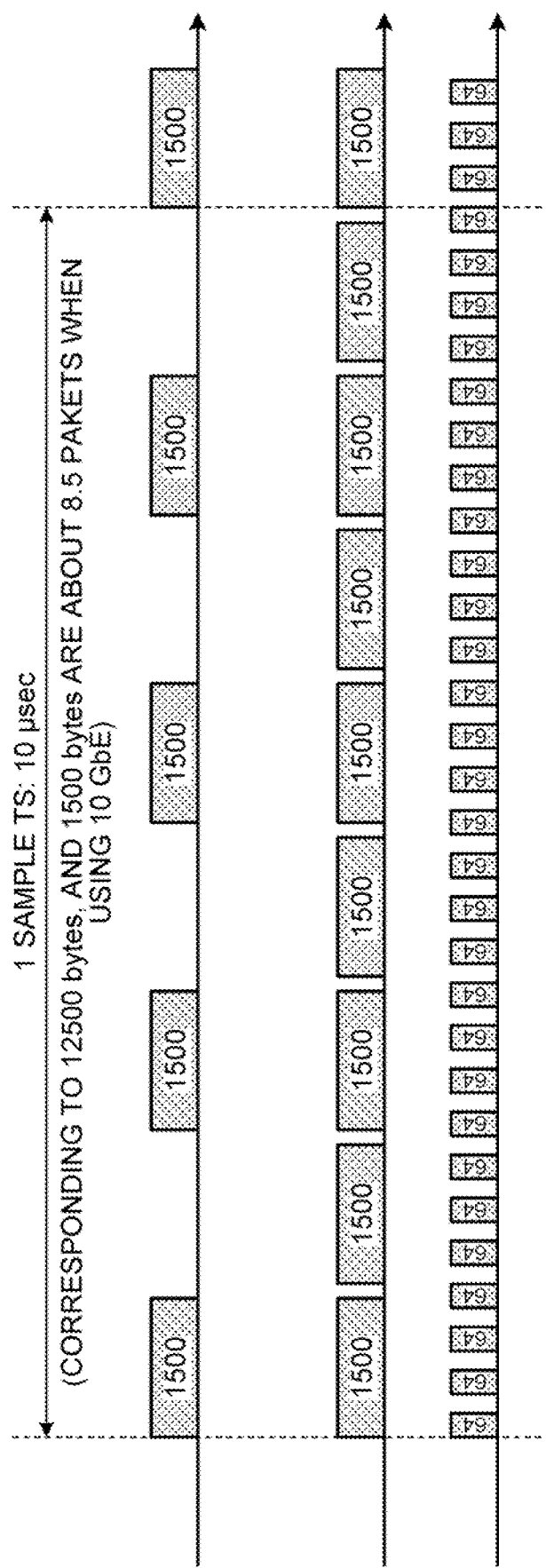
FIG. 6 is a diagram illustrating an example of MFH packets and non-MPH packets.

FIG. 6 is a diagram illustrating an example of the MPH packets and the non-MFH packets. The MPH packets each are, for example, a 1500-byte packet. Furthermore, the non-MPH packets are formed of two types that are, for example, a 1500-byte packet and a 64-byte packet.

Figure 7:
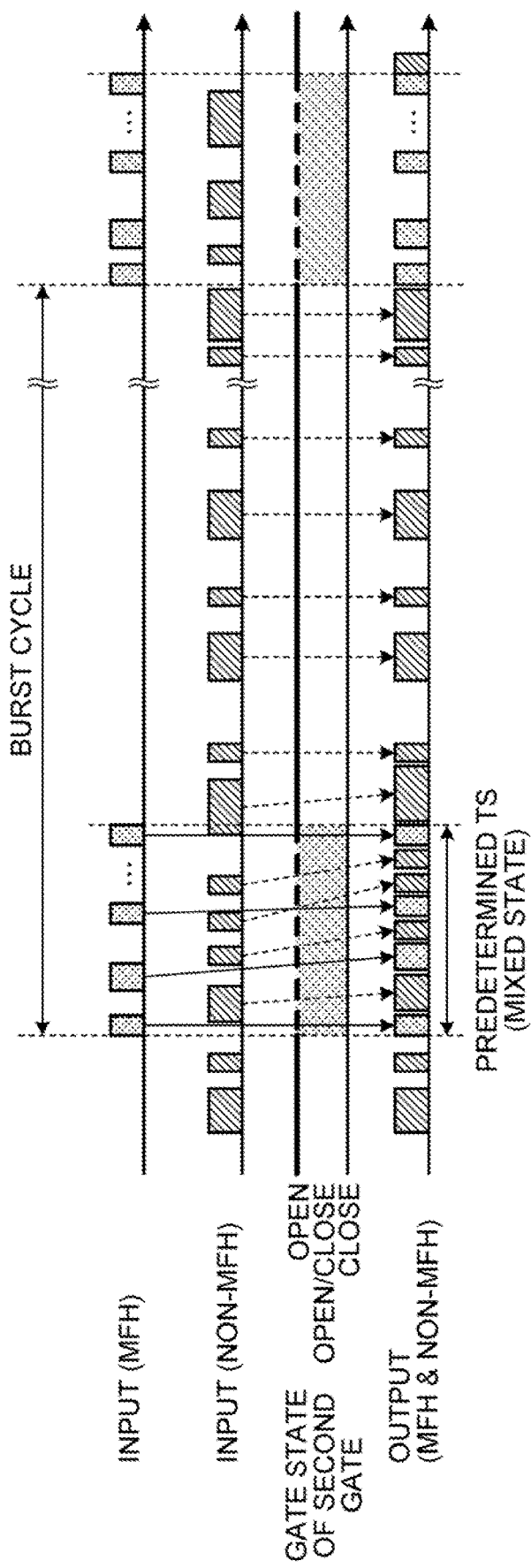
FIG. 7 is a diagram illustrating an example of a steady monitoring process performed in a predetermined TS in which a mixed state according to the first embodiment is set.

FIG. 7 is a diagram illustrating an example of a steady monitoring process performed in the predetermined TS in which the mixed state according to the first embodiment is set. The determination unit 28B determines whether an amount of output delay of the MFH packet in the predetermined TS that is set to the mixed state is within an allowable value. When an amount of output delay of the MPH packet is within an allowable value, the determination unit 28B determines that there is a space, in the predetermined TS, in which the non-MFH packet can be interrupted. Furthermore, because the non-MFH packet is allowed to be interrupted in the predetermined TS only when the amount of output delay of the MPH packet is within the allowable value, it is possible to avoid the output delay of the MPH packet by outputting the non-MPH packet.

It is assumed that, in the predetermined TS that is set to the mixed state, for example, when 10 GbE is used, non-MFH packets of 9000 bytes (7.2 μs) and MPH packets of 68 bytes (0.05 μs) are output and an allowable value of an amount of output delay of the MPH packets is 5 μs.

For example, when some MPH packets arrives after the non-MPH packets corresponding to 1000 bytes are output, it takes 6.4 μs as the remaining amount output time to output the non-MFH packets corresponding to the remaining 8000 bytes. At this time, the control unit 28 sets the remaining amount output time (6.4 μs) of the non-MFH packets to an amount of output delay of the MFH packets, and then, discards the non-MPH packets corresponding to the remaining 8000 bytes and outputs the MFH packets with priority because an amount of output delay (6.4 μs) exceeds the allowable value (5 μs).

Furthermore, for example, when some MPH packets arrives after the non-MPH packets corresponding to 3000 bytes are output, it takes 4.8 μs as the remaining amount output time to output the non-MFH packets corresponding to the remaining 6000 bytes. At this time, the control unit 28 sets the remaining amount output time (4.8 μs) of the non-MFH packets to an amount of output delay of the MPH packets, and then, outputs the MPH packets after outputting the non-MPH packets corresponding to the remaining 6000 bytes because an amount of output delay (4.8 μs) is less than the allowable value (5 μs).

The allocating unit 28C allocates the MPH packets and the non-MPH packets to the predetermined TS when the amount of output delay of the MPH packets in the predetermined TS that is set in the mixed state is within the allowable value. The packet control unit 28D sets the gate state of the allocation timing of the MPH packets in the predetermined TS to the priority state and sets the gate state of the allocation timing of the non-MPH packets in the predetermined TS to the normal state. Namely, even in a case of the predetermined TS associated with the cyclic pattern of the MPH packets, when there is a space for the MFH packet in the predetermined TS, the packet control unit 28D can suppresses the output delay of the non-MPH packets by ensuring an output opportunity of the non-MPH packets.

Figure 8:
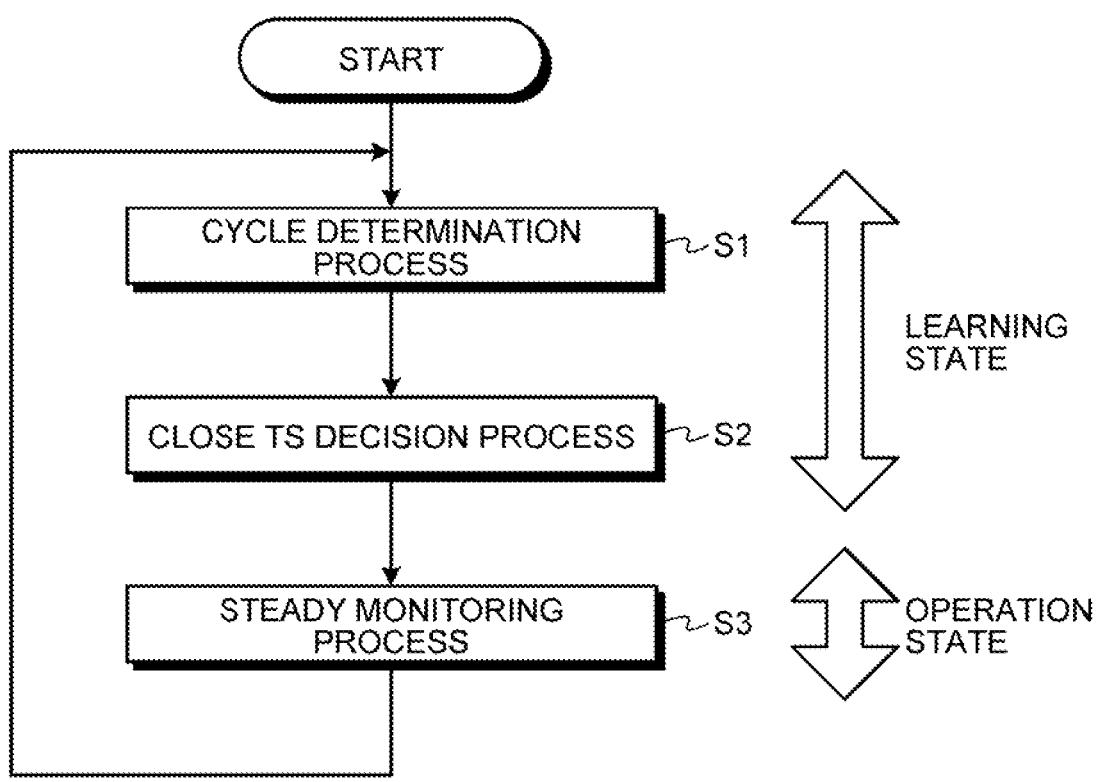
FIG. 8 is a flowchart illustrating an example of the flow of the processing operation performed by the packet processing unit related to an overall process.

In the following, an operation of the communication system 1 according to the first embodiment will be described. FIG. 8 is a flowchart illustrating an example of the flow of the processing operation performed by the packet processing unit 12 related to an overall process. The learning unit 25 in the packet processing unit 12 performs the cycle determination process of monitoring the flow rate of the MH packets, detecting a burst cycle of the MPH packets, and specifying the cyclic pattern of the MFH packets from the burst cycle of the MFH packets (Step S1). Furthermore, the setting unit 28A in the packet processing unit 12 performs the close TS decision process of setting the gate state of the first gate 22A and the second gate 22B for each TS in the burst cycle in accordance with the cyclic pattern of the MFH packets (Step S2). The control unit 28 in the packet processing unit 12 performs the steady monitoring process that performs control of, based on the gate state of the first gate 22A and the second gate 22B for each TS that is set in the close TS decision process, output of the arriving MPH packets and the non-MFH packets (Step S3).

The learning unit 25 in the packet processing unit 12 specifies the cyclic pattern of the MH packets from the flow rate of the MPH packets. Furthermore, the setting unit 28A in the packet processing unit 12 discriminates the gate state of the first gate 22A and the second gate 22B for each TS from the cyclic pattern of the MPH packets and sets the gate state for each TS in the list table 26. The control unit 28 in the packet processing unit performs control of opening and closing the first gate 22A and the second gate 22B for each TS based on the gate state of each of the first gate 22A and the second gate 22B for each TS while referring to the list table 26. Consequently, by efficiently outputting the non-MPH packets while outputting the MPH packets with priority, it is possible to suppress the output delay of the MPH packets and the non-MPH packets.

Figure 9:
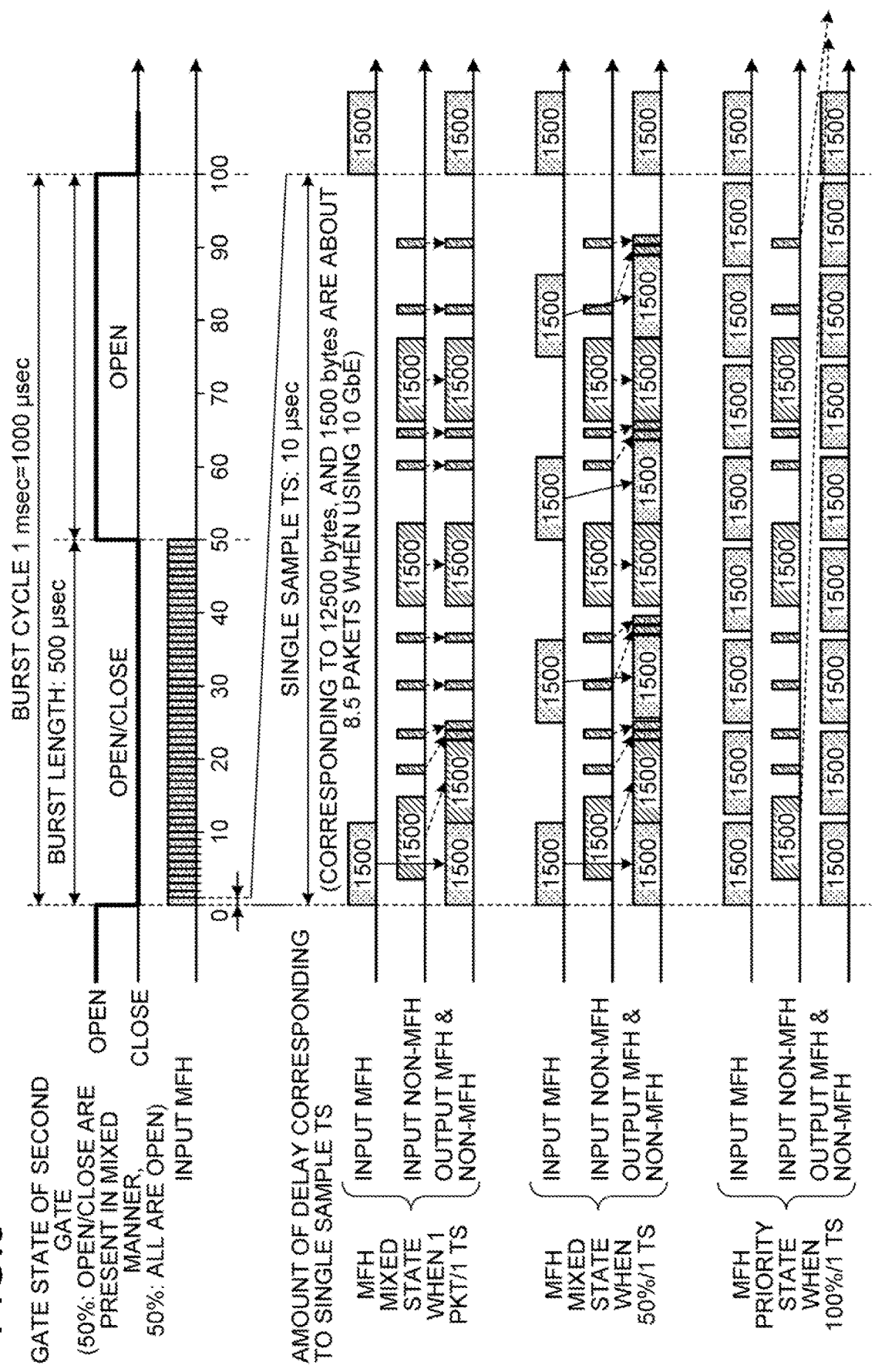
FIG. 9 is a diagram illustrating an example of the steady monitoring process performed in a predetermined TS in which the mixed state or a priority state is set.

FIG. 9 is a diagram illustrating an example of the steady monitoring process in the mixed state. Furthermore, for convenience of description, it is assumed that wire communication is 10 GbE, the length of a single burst is 500 μs, a burst cycle is 1000 μs, the TS in the mixed state is 10 μs, a single TS is 12500 bytes, and a 1500-byte packet corresponds to 8.5 packets.

Regarding the packet processing unit 12, it is assumed of a case in which one MFH packet of 1500 bytes, three non-MPH packets of 1500 bytes, and eight non-MFH packets of 64 bytes are input to the predetermined TS that is in the mixed state. When the packet processing unit 12 outputs the MFH packet and the non-MFH packets that are input to the mixed state predetermined TS, an amount of output delay of the MPH packet is within the allowable value; therefore, the packet processing unit 12 allocates the one MPH packet and the eleven non-MFH packets to the predetermined TS. The packet processing unit 12 sets the gate state of the output timing of the one MFH packet allocated into the predetermined TS to the priority state and sets the gate state of the output timing of the eleven non-MFH packets allocated into the predetermined TS to the normal state. Consequently, the packet processing unit 12 can output thirteen non-MFH packets at the timing of the predetermined TS in which one MFH packet is output with priority.

Furthermore, it is assumed of a case in which, in the packet processing unit 12, four MFH packets of 1500 bytes, three non-MPH packets of 1500 bytes, and eight non-MFH packets of 64 bytes are input to the mixed state TS. When the packet processing unit 12 outputs the MFH packets and the non-MPH packets that are input to the mixed state predetermined TS, an amount of output delay of the MPH packets is within the allowable value; therefore, the packet processing unit 12 allocates four MPH packets and eleven non-MPH packets into the predetermined TS. The packet processing unit 12 sets the gate state of the output timing of the four MPH packets allocated into the predetermined TS to the priority state and sets the gate state of the output timing of the eleven non-MPH packets allocated into the predetermined TS to the normal state. Consequently, the packet processing unit 12 can output thirteen non-MFH packets at the timing of the predetermined TS in which the four MFH packets are output with priority.

Furthermore, it is assumed of a case in which, in the packet processing unit 12, eight MPH packets of 1500 bytes, three non-MPH packets of 1500 bytes, and eight non-MPH packets of 64 bytes are input to the mixed state TS. When the packet processing unit 12 outputs the MPH packets and the non-MFH packets to the predetermined TS that is in the mixed state, an amount of output delay of the MPH packets exceeds the allowable value; therefore, the packet processing unit 12 allocates only the eight MPH packets to the predetermined TS. The packet processing unit 12 sets the gate state of the output timing of the eight MPH packets allocated into the predetermined TS to the priority state. Consequently, the packet processing unit 12 can output the eight MPH packets with priority at the timing of the predetermined TS.

For example, it is assumed of a state in which the non-MPH packet delays 500 μs to the maximum and an MPH packet is present in the first half of the section in the TS. In this case, when the gate state of the predetermined TS is the mixed state and the MPH packet is one packet (1 μs), the improvement effect of the delay of the non-MFH packet is $\frac{1}{500}$. Furthermore, when the gate state of the predetermined TS is in the mixed state and the number of the MPH packets are four (4 μs), the improvement effect of the delay of the non-MFH packets is $\frac{1}{125}$.

The packet processing apparatus 5 according to the first embodiment allocates the MFH packets and the non-MPH packets to the predetermined TS if an amount of output delay of the MPH packets is within the allowable value when the packet processing apparatus 5 outputs the MPH packets and the non-MPH packets that are input to the predetermined TS that is in the mixed state. Furthermore, the packet processing apparatus 5 sets the gate state of the output timing of the MH packets allocated into the predetermined TS to the priority state and sets the gate state of the output timing of the non-MPH packets allocated into the predetermined TS to the normal state. The packet processing apparatus 5 outputs the non-MFH packets at the remaining timing in the predetermined TS while outputting, with priority, the MPH packets at the timing of the predetermined TS. Consequently, it is possible to improve the total throughput of all of the outputs of the packets by efficiently outputting the non-MPH packets while outputting the MPH packets with priority. In addition, it is possible to suppress the output delay of the MPH packets and the non-MPH packets.

Furthermore, regarding the packet processing apparatus 5 according to the first embodiment, a description has been given of the close TS decision process of discriminating the gate state for each TS in a single sample cycle and setting the gate state for each TS based on the discrimination result of the gate state for each TS. However, it is conceivable that the discrimination result of the gate state for each identical TS in continuous sample cycles is changed. Thus, embodiment of coping with this state will be described as a second and a third embodiments.

[b] Second Embodiment

Figure 10:
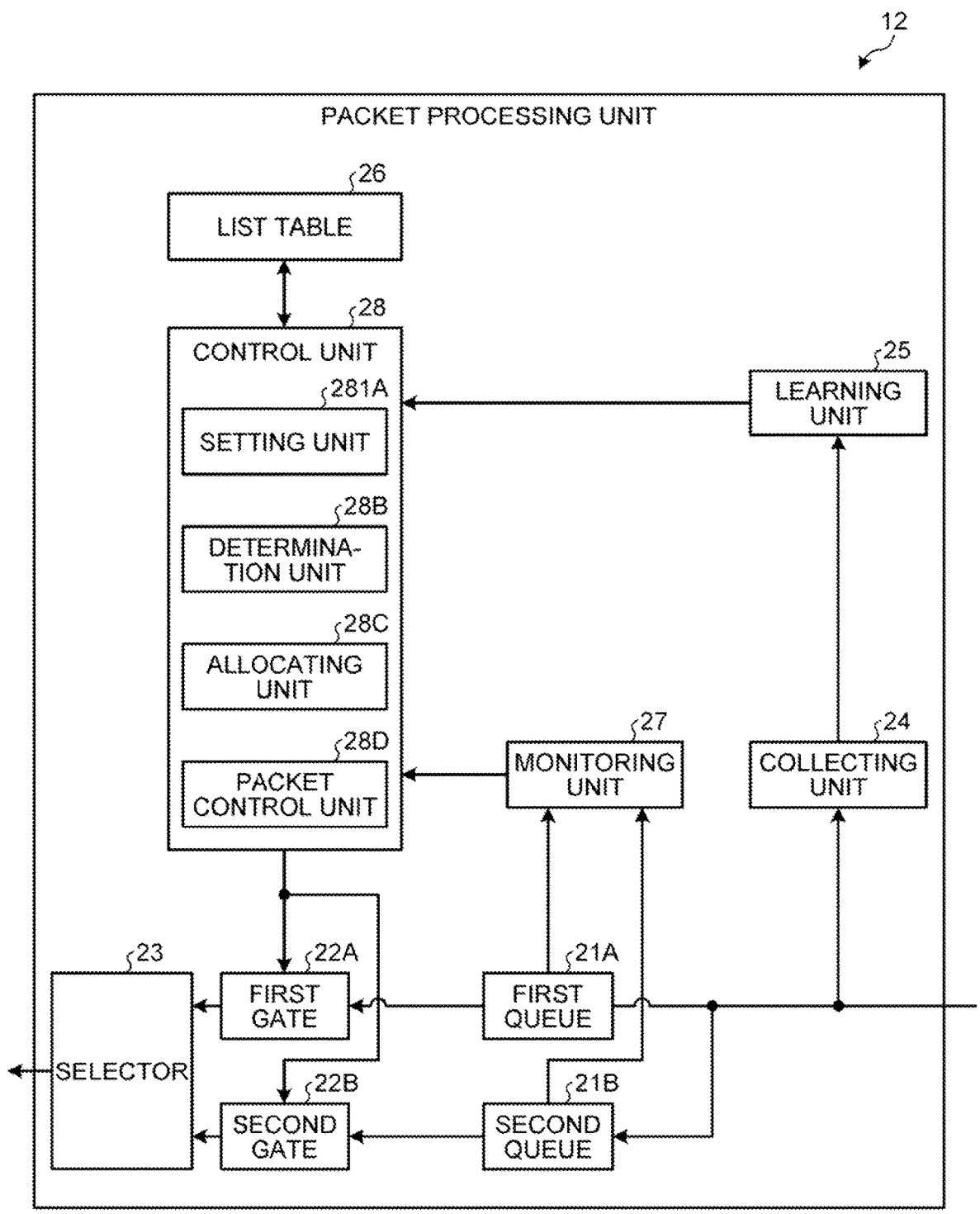
FIG. 10 is a diagram illustrating an example of a configuration of a packet processing unit according to a second embodiment.

FIG. 10 is a diagram illustrating an example of a configuration of the packet processing unit 12 according to a second embodiment. Furthermore, by assigning the same reference numerals to components having the same configuration as those in the first embodiment, overlapped descriptions of the configuration and the operation thereof will be omitted. The monitoring unit 27 in the packet processing unit 12 measures the number of packets and the number of bytes of the MFH packets in the designated TS for each sample cycle. Furthermore, it is assumed that the sample cycle is multiple times, for example, three cycles. The packet processing unit 12 according to the second embodiment arranges a setting unit 281A instead of the setting unit 28A according to the first embodiment. The setting unit 281A discriminates that, when the number of packets of the MFH packets in the designated TS is not present, the gate state of the second gate 22B in the subject designated TS to the open state, i.e., the gate state of the subject designated TS is the normal state.

The setting unit 281A discriminates that, when the number of packets of the MPH packets is present and the number of packets of the MPH packets is greater than or equal to packet threshold, the gate state of the second gate 22B of the designated TS is the closed state, i.e. namely, the gate state of the designated TS is the priority state. When the number of packets of the MPH packets is present and the number of bytes of the MPH packets is greater than or equal to the byte threshold, the setting unit 281A discriminates the gate state of the second gate 22B of the designated TS to the closed state, namely, the gate state of the designated TS is the priority state.

Furthermore, when the flow rate of the MFH packets is present and the number of packets of the MPH packets is less than the packet threshold and the number of bytes of the MPH packets is less than the byte threshold, the setting unit 281A discriminates that the gate state of the second gate 22B of the subject designated TS is the open/closed state. Namely, the setting unit 281A discriminates that the gate state of the designated TS is the mixed state.

When it is discriminated that the gate state of the designated TS in the sample cycle is the priority state, the setting unit 281A sets the gate state of the subject designated TS to the priority state. Furthermore, when it is discriminated that the gate state of the designated TS in the sample cycle is the mixed state, the setting unit 281A sets the gate state of the subject designated TS to the mixed state. Furthermore, when it is discriminated that the gate states of the designated TSs are continuously normal state across the sample cycles, the setting unit 281A sets the gate state of the subject designated TS to the normal state.

Figure 11:
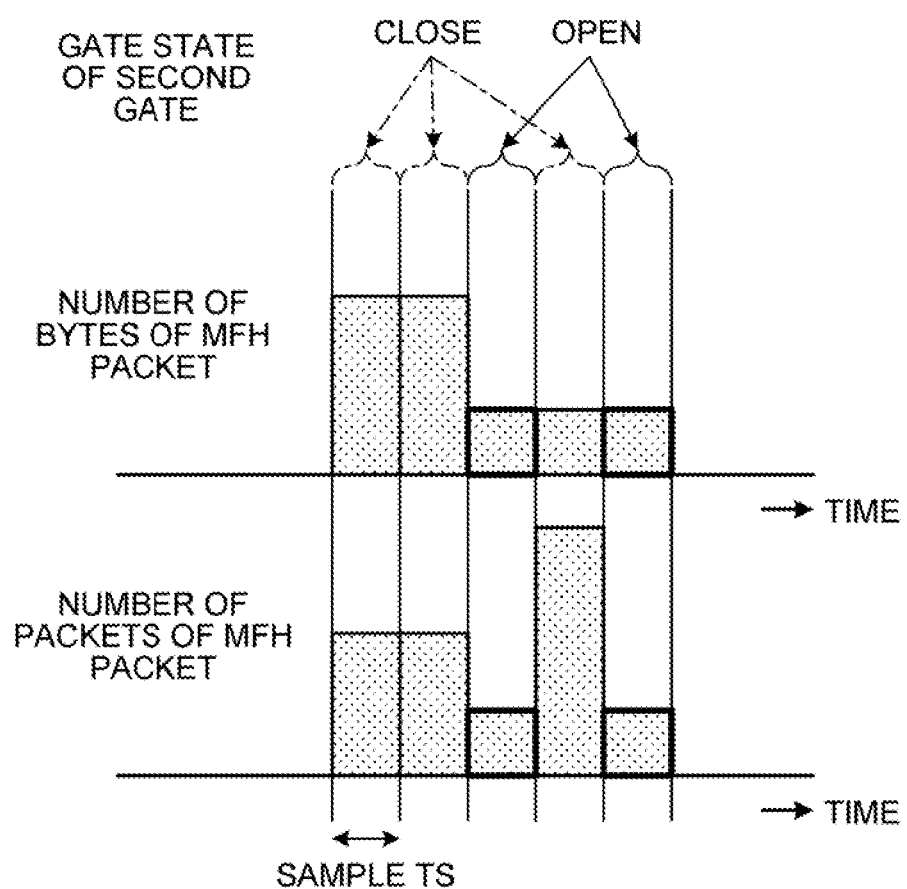
FIG. 11 is a diagram illustrating an example of an operation performed by a monitoring unit that monitors the number of bytes and the number of packets for each sample TS.

FIG. 11 is a diagram illustrating an example of an operation performed by the monitoring unit 27 that monitors the number of bytes and the number of packets for each sample TS. The monitoring unit 27 collects the number of bytes and the number of packets of the MPH packets from the flow rate of the MFH packets retaining in the first queue 21A for each designated TS in the sample cycle.

Figure 12:
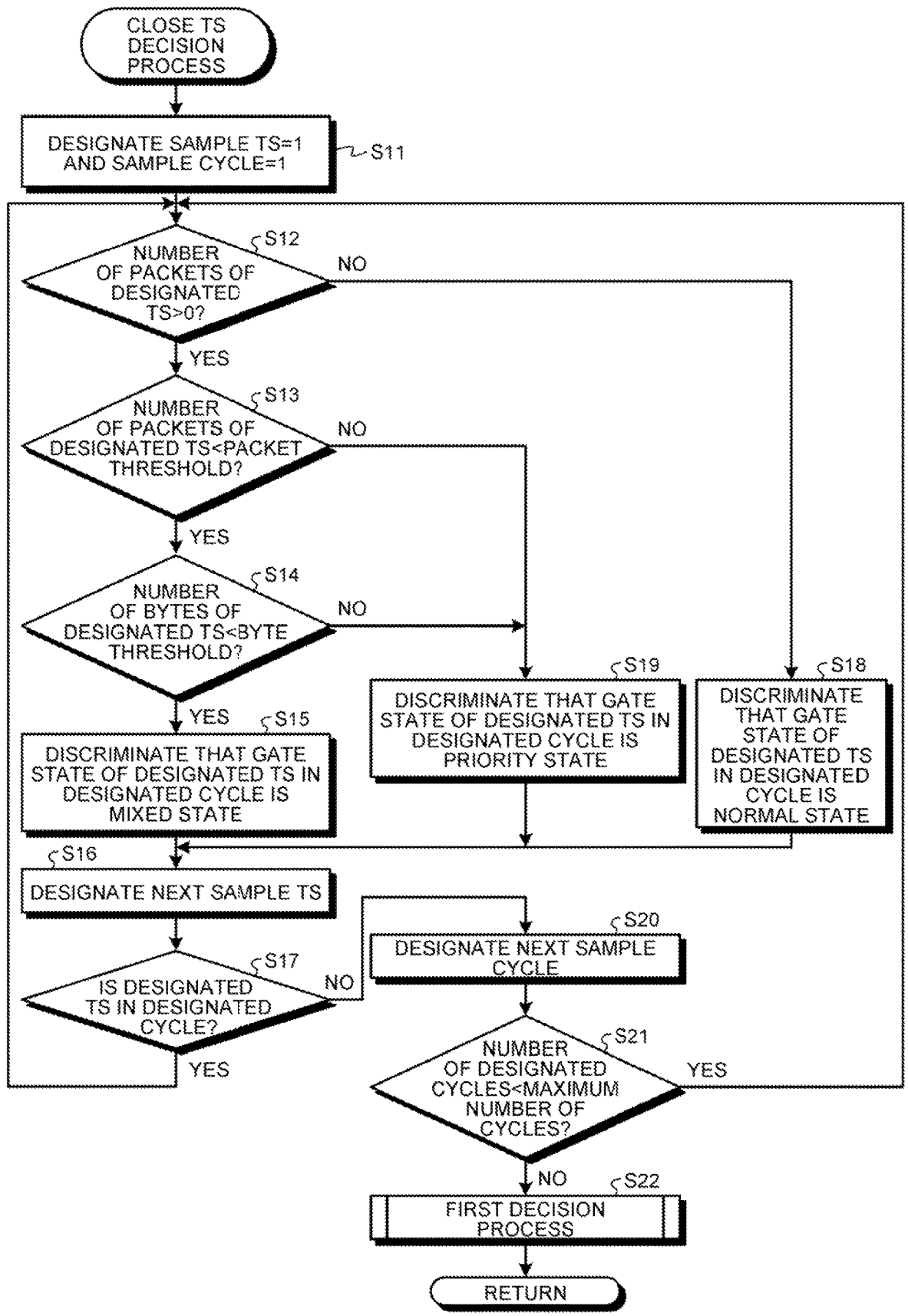
FIG. 12 is a diagram illustrating an example of the flow of the processing operation performed by a setting unit related to a close TS decision process according to the second embodiment.

FIG. 12 is a diagram illustrating an example of the flow of the processing operation performed by the setting unit 281A related to the close TS decision process according to the second embodiment. Furthermore, for convenience of description, a description will be given with the assumption that the sample cycle is "3" and the sample TSs in the sample cycle are "1" to "100". In FIG. 12, the setting unit 281A designates "1" as the sample cycle and "1" as the sample TS (Step S11). The setting unit 281A determines whether the number of packets of the designated TSs exceeds "0" (Step S12).

When the number of packets of the MFH packets in the designated TS exceeds "0" (Yes at Step S12), the setting unit 281A determines that the MFH packets are present at the timing of the designated TS. Then, the setting unit 281A determines whether the number of packets of MPH packets in the designated TS is less than the packet threshold (Step S13). Furthermore, the packet threshold corresponds to the number of packets of the MFH packets to an extent, for example, that a non-MPH packet can interrupt. When the number of packets of the MPH packets in the designated TS is less than the packet threshold (Yes at Step S13), the setting unit 281A determines whether the number of bytes of the MPH packets in the designated TS is less than the byte threshold (Step S14). Furthermore, the byte threshold corresponds to the number of bytes of MFH packets to an extent, for example, that a non-MFH packet can interrupt.

When the number of bytes of the MPH packet in the designated TS is less than the byte threshold (Yes at Step S14), the setting unit 281A discriminates that the gate state of the first gate 22A and the second gate 22B of the designated TS in the designated cycle is the mixed state (Step S15). Namely, the setting unit 281A discriminates that the gate state of the second gate 22B in the designated TS is the open and closed state (O/C). Furthermore, after the setting unit 281A discriminates the gate state of the designated TS of the designated cycle, the setting unit 281A designates the next sample TS (Step S16). Furthermore, after the setting unit 281A designates the next sample TS, the setting unit 281A determines whether the current designated TS is in the designated cycle (Step S17). Furthermore, as the process of determining whether the designated TS is in the designated cycle, it is possible to determine whether the designated TS exceeds "100".

When the current designated TS is in the designated cycle (Yes at Step S17), the setting unit 281A proceeds to Step S12 in order to determine whether the number of packets of the MPH packets in the current designated TS exceeds "0". Furthermore, when the number of packets of the MPH packets in the current designated TS does not exceed "0" (No at Step S12), the setting unit 281A determines that the MPH packet is not present in the designated TS. Then, the setting unit 281A discriminates that the gate state of the first gate 22A and the second gate 22B of the designated TS in the designated cycle is the normal state (Step S18) and proceeds to Step S16 in order to designate the next sample TS. Namely, the setting unit 281A discriminates that the gate state of the second gate 22B in the designated TS is the open state (O).

When the number of packets of the MFH packets in the designated TS is not less than the packet threshold (No at Step S13), the setting unit 281A discriminates that the gate state of the first gate 22A and the second gate 22B of the designated TS in the designated cycle is the priority state (Step S19). Then, after the setting unit 281A discriminates that the gate state is the priority state, the setting unit 281A proceeds to Step S16 in order to designate the next sample TS. Furthermore, when the number of packets of the MPH packets in the designated TS is not less than the byte threshold (No at Step S14), the setting unit 281A proceeds to Step S19 in order to discriminate that the gate state of the first gate 22A and the second gate 22B of the designated TS in the designated cycle is the priority state. Namely, the setting unit 281A designates that the gate state of the second gate 22B of the designated TS is the closed state (C).

Furthermore, when the current designated TS is not in the designated cycle (No at Step S17), the setting unit 281A designates the next sample cycle (Step S20) and determines whether the number of designated cycles is less than the maximum number of cycles (Step S21). Furthermore, it is assumed that the maximum number of cycles is, for example, 3 cycles.

When the number of designated cycles is less than the maximum number of cycles (Yes at Step S21), the setting unit 281A proceeds to Step S12 in order to determine whether the number of packets of the MPH packets in the designated TS exceeds "0". Furthermore, when the number of designated cycles is not less than the maximum number of cycles (No at Step S21), the setting unit 281A performs the first decision process that will be described later (Step S22) and ends the close TS decision process.

When the number of packets of the MFH packets of the designated TS for each designated cycle does not exceed "O", the setting unit 281A discriminates that gate state of the designated TS in the designated cycle is the normal state. Furthermore, when the number of packets of the MFH packets in the designated TS for each designated cycle exceeds "0", the number of packets is less than the packet threshold, and the number of bytes is less than the byte threshold, the setting unit 281A discriminates that the gate state of the designated TS in the designated cycle is the mixed state. Furthermore, when the number of packets of the MPH packets in the designated TS in each of the designated cycles exceeds "0", the number of packets exceeds the packet threshold, or the number of bytes exceeds the byte threshold, the setting unit 281A discriminates that the gate state of the designated TS in the designated cycle is the priority state. Consequently, the setting unit 281A can distinguish the gate state of the designated TS for each of the continuous designated cycles.

Figure 13:
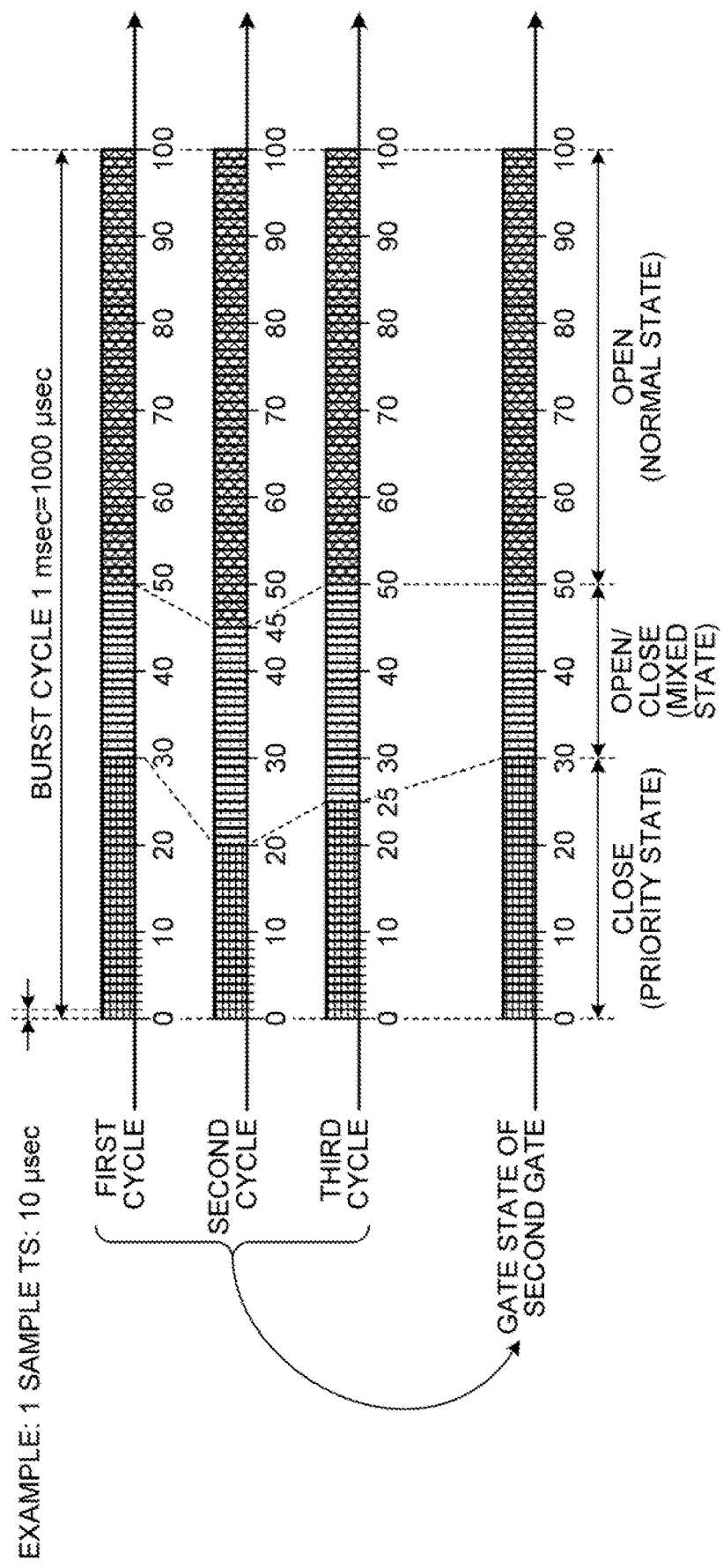
FIG. 13 is a diagram illustrating an example of the flow of the processing operation performed by the setting unit related to a first decision process.

FIG. 13 is a diagram illustrating an example of the flow of the processing operation performed by the setting unit 281A related to a first decision process. Furthermore, for convenience of description, it is assumed that, in the setting unit 281A, for example, the sample cycles are 3 cycles and the sample TSs are 100 TS ("1" to "100").

The setting unit 281A discriminates that the gate state of the second gate 22B of the designated TSs "1" to "30" in the first cycle is the closed state, i.e., discriminates that the gate state of the first gate 22A and the second gate 22B is the priority state. Furthermore, the setting unit 281A discriminates that the gate state of the second gate 22B of the designated TSs "31" to "50" in the first cycle is the open/closed state, i.e., discriminates that the gate state of the first gate 22A and the second gate 22B is the mixed state. Furthermore, the setting unit 281A discriminates that the gate state of the second gate 228 of the designated TSs "51" to "100" in the first cycle is the open state, i.e., discriminates that gate state of the first gate 22A and the second gate 22B is the normal state.

The setting unit 281A discriminates that the gate state of the second gate 22B of the designated TS "1" to "20" in the second 2 cycle is the closed state, i.e., discriminates that the gate state of the first gate 22A and the second gate 22B is the priority state. Furthermore, the setting unit 281A discriminates that the gate state of the second gate 22B of the designated TSs "21" to "45" in the second cycle is the open/closed state, i.e., discriminates that the gate state of the first gate 22A and the second gate 22B is the mixed state. Furthermore, the setting unit 281A discriminates that the gate state of the second gate 22B of the designated TS "46" to "100" in the second cycle is the open state, i.e., discriminates that the gate state of the first gate 22A and the second gate 22B is the normal state.

The setting unit 281A discriminates that the gate state of the second gate 22B of the designated TS "1" to "30" in the third cycle is the closed state, i.e., discriminates that the gate state of the first gate 22A and the second gate 22B is the priority state. Furthermore, the setting unit 281A discriminates that the gate state of the second gate 22B of the designated TSs "31" to "50" in the third cycle is the open/closed state, i.e., discriminates that the gate state of each of the first gate 22A and the second gate 22B is the mixed state. Furthermore, the setting unit 281A discriminates that the gate state of the second gate 22B of the designated TSs "51" to "100", in the third cycle, i.e., discriminates that the gate state of each of the first gate 22A and the second gate 22B is the normal state.

Figure 14:
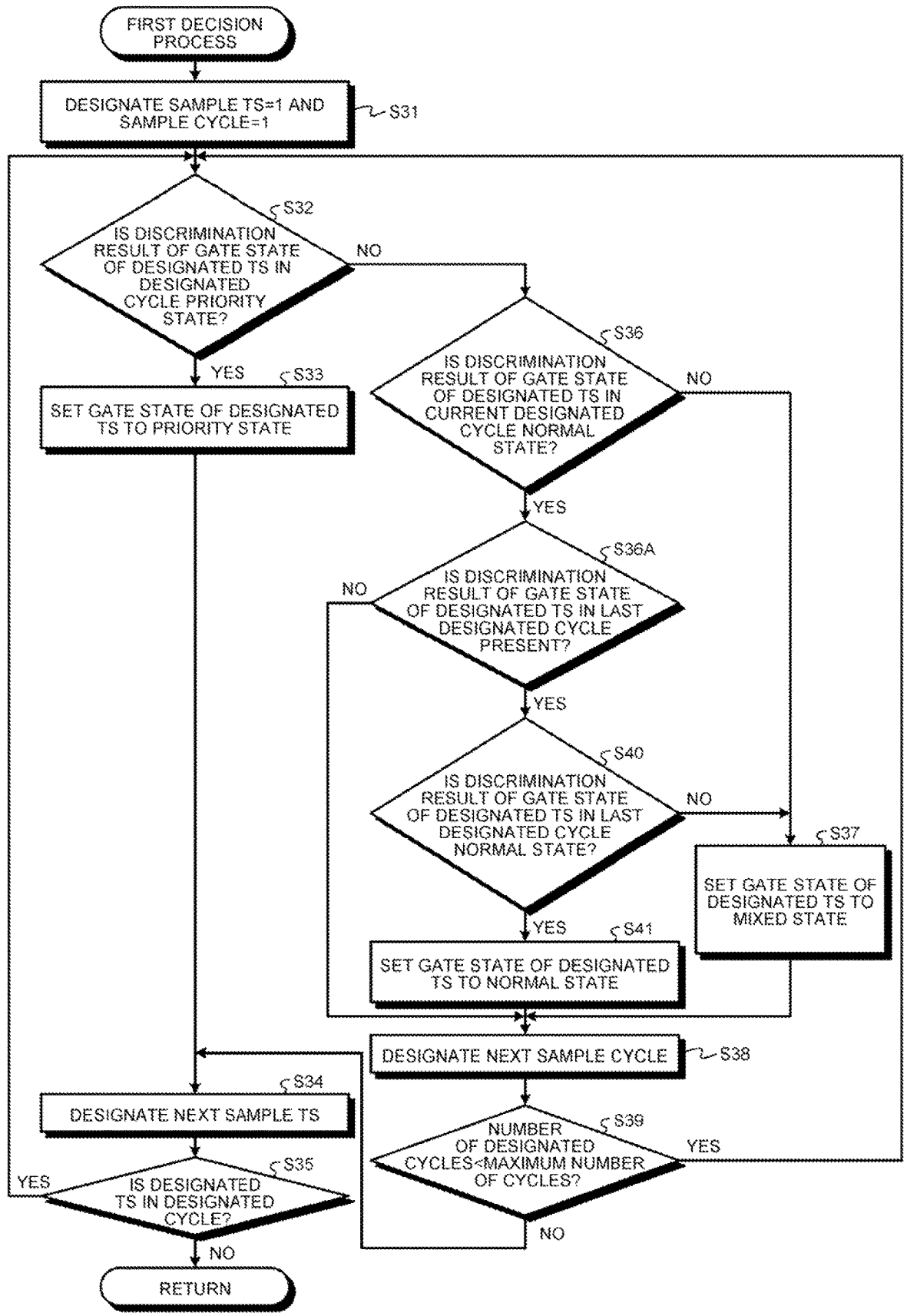
FIG. 14 is a diagram illustrating an example of the flow of the processing operation performed by the setting unit related to the first decision process.

FIG. 14 is a diagram illustrating an example of the flow of the processing operation performed by the setting unit 281A related to the first decision process. The setting unit 281A designates "1" as the sample cycle and "1" as the sample TS (Step S31). The setting unit 281A determines whether the discrimination result of the gate state of the designated TS in the designated cycle is the priority state (Step S32). Furthermore, the discrimination result is the discrimination result of the gate state discriminated based on the process performed at Steps S15, S18, and S19. When the discrimination result of the gate state of the designated TS in the designated cycle is the priority state (Yes at Step S32), the setting unit 281A sets the gate state of the designated TS to the priority state (Step S33). Namely, even when the discrimination results of a plurality of the same designated TSs in the designated cycle is the priority state only once, the setting unit 281A sets the gate state of the subject designated TSs to the priority state. Namely, the setting unit 281A sets the gate state of the second gate 22B of the designated TS to the closed state. For example, the setting unit 281A sets the gate state of the second gate 22B of the designated TSs "1" to "30" illustrated in FIG. 13 to the closed state.

The setting unit 281A designates the next sample TS (Step S34), and determines whether the currently designated TS is in the designated cycle (Step S35). When the currently designated TS is in the designated cycle (Yes at Step S35), the setting unit 281A proceeds to Step S32 in order to whether the discrimination result of the gate state of the designated TS is the priority state.

When the discrimination result of the gate state of the current designated TS is not the priority state (No at Step S32), the setting unit 281A determines whether the discrimination result of the gate state of the designated TS in the current designated cycle is the normal state (Step S36). When the discrimination result of the gate state of the designated TS in the current designated cycle is the normal state is not the normal state (No at Step S36), the setting unit 281A determines that the discrimination result of the gate state of the designated TS is the mixed state and sets the gate state of the designated TS to the mixed state (Step S37). Namely, when the discrimination result of the gate state of a plurality of the same designated TSs in the designated cycle is the mixed state only once, the setting unit 281A sets the gate state of the subject designated TSs to the mixed state. Namely, the setting unit 281A sets the gate state of the second gate 22B of the designated TSs to the open/closed state. For example, the setting unit 281A sets the gate state of the second gate 22B of the designated TSs "31" to "50" illustrated in FIG. 13 to the open/closed state.

Furthermore, after the setting unit 281A sets the gate state of the designated TS, the setting unit 281A designates the next sample cycle (Step S38) and determines whether the number of designated cycles is the maximum number of cycles (Step S39). When the number of designated cycles is less than the maximum number of cycles (Yes at Step S39), the setting unit 281A proceeds to Step S32 in order to determine whether the discrimination result of the gate state of the designated TS in the designated cycle is the priority state.

Furthermore, when the discrimination result of the gate state of the designated TS in the current designated cycle is the normal state (Yes at Step S36), the setting unit 281A determines whether the discrimination result of the gate state of the designated TS in the last designated cycle is present (Step S36A). When the discrimination result of the gate state of the designated TS in the last designated cycle is present (Yes at Step S36A), the setting unit 281A determines whether the discrimination result of the gate state of the designated TS in the last designated cycle is the normal state (Step S40). Furthermore, for example, it is assumed that, when the last designated cycle is "2", the last designated cycle is "1" and it is assumed that, when the current designated cycle is "3", the last designated cycle is "2".

When the discrimination result of the gate state of the designated TS in the last designated cycle is the normal state (Yes at Step S40), the setting unit 281A sets the gate state of the designated TS to the normal state (Step S41) and proceeds to Step S38 in order to designate the next sample cycle. Namely, when the discrimination result of the gate state of a plurality of the same designated TSs in the designated cycle is continuously the normal state, the setting unit 281A sets the gate state of the subject designated TSs to the normal state. Namely, the setting unit 281A sets the gate state of the second gate 22B of the designated TSs to the open state. For example, the setting unit 281A sets the gate state of the second gate 22B of the designated TSs "51" to "100" illustrated in FIG. 13 to the open state.

Furthermore, when the number of designated cycles is not less than the maximum number of cycles (No at Step S39), the setting unit 281A proceeds to Step S34 in order to designate the next sample TS. Furthermore, when the current designated TS is not in the designated cycle (No at Step S35), the setting unit 281A ends the first decision process. Furthermore, when the gate state of the designated TS of the last designated cycle is not present (No at Step S36A), the setting unit 281A proceeds to Step S38 in order to designate the next sample cycle.

Even when the discrimination result of the gate state of a plurality of the same designated TSs in the designated cycle is the priority state only once, the setting unit 281A sets the gate state of the subject designated TSs to the priority state. Namely, the setting unit 281A sets the gate state of the second gate 228 of the designated TS to the closed state.

Even when the discrimination result of the gate state of a plurality of the same designated TSs in the designated cycle is the mixed state only once, the setting unit 281A sets the gate state of the subject designated TSs to the mixed state. Namely, the setting unit 281A sets the gate state of the second gate 22B of the designated TS to the open/closed state.

When the discrimination result of the gate state of all of a plurality of the same designated TSs in the designated cycle are continuously the normal state, the setting unit 281A sets the gate state of the subject designated TSs to the normal state. Namely, the setting unit 281A sets the gate state of the second gate 22B of the designated TS to the open state.

Even when the discrimination result of the gate state of the same designated TSs in the continuous sample cycles is the priority state only once, the packet processing apparatus 5 according to the second embodiment sets the gate state of the subject designated TSs to the priority state. Furthermore, even when the discrimination result of the gate state of the same designated TSs in the continuous sample cycles is the mixed state only once, the packet processing apparatus 5 sets the gate state of the subject designated TSs to the mixed state. Furthermore, when the discrimination result of the gate state of all of a plurality of the same designated TSs in the sample cycle are continuously the normal state, the packet processing apparatus 5 sets the gate state of the subject designated TSs to the normal state. Even when fluctuation in which the discrimination result of the gate state for each of the same TSs is changed between the continuous sample cycles occurs, it is possible to set the gate state for each TS.

[c] Third Embodiment

Figure 15:
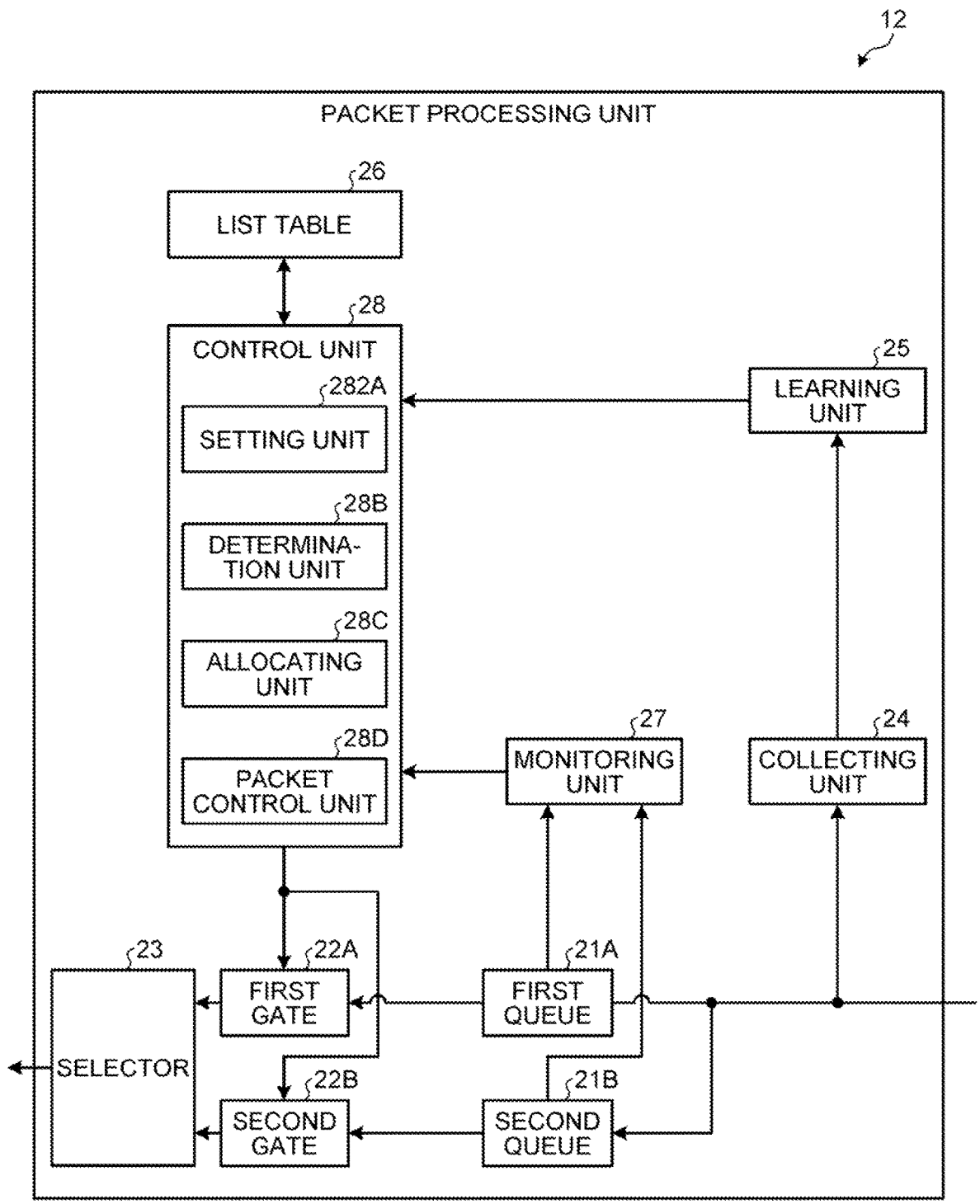
FIG. 15 is a diagram illustrating an example of a configuration of a packet processing unit according to a third embodiment.

FIG. 15 is a diagram illustrating an example of a configuration of the packet processing unit 12 according to a third embodiment. Furthermore, by assigning the same reference numerals to components having the same configuration as those in the first embodiment, overlapped descriptions of the configuration and the operation thereof will be omitted. The monitoring unit 27 in the packet processing unit 12 measures the flow rate of the MPH packets in the designated TS for each sample cycle. In the packet processing unit 12 according to the third embodiment, a setting unit 282A is arranged instead of the setting unit 28A according to the first embodiment. When the flow rate of the MPH packets in the designated TS is not present, the setting unit 282A sets the gate state of the second gate 22B in the subject designated TS to the open state, i.e., determines that the gate state of the designated TS is the normal state. When the flow rate of the MPH packets in the designated TS is present, the setting unit 282A sets the gate state of the second gate 22B in the subject designated TS to the closed state, i.e., determines that the gate state of the designated TS is the priority state.

Furthermore, when it is discriminated that the gate states of all of the designated TSs are continuously the normal state across the sample cycles, the setting unit 282A sets the gate state of the subject designated TSs to the normal state. Furthermore, when it is discriminated that the gate states of all of the designated TSs are continuously the priority state across the sample cycles, the setting unit 282A sets the gate state of the subject designated TSs to the priority state. When it is discriminated that the gate states of the designated TSs are different gate states across the sample cycles, the setting unit 282A sets the gate state of the designated TS to the mixed state.

Figure 16:
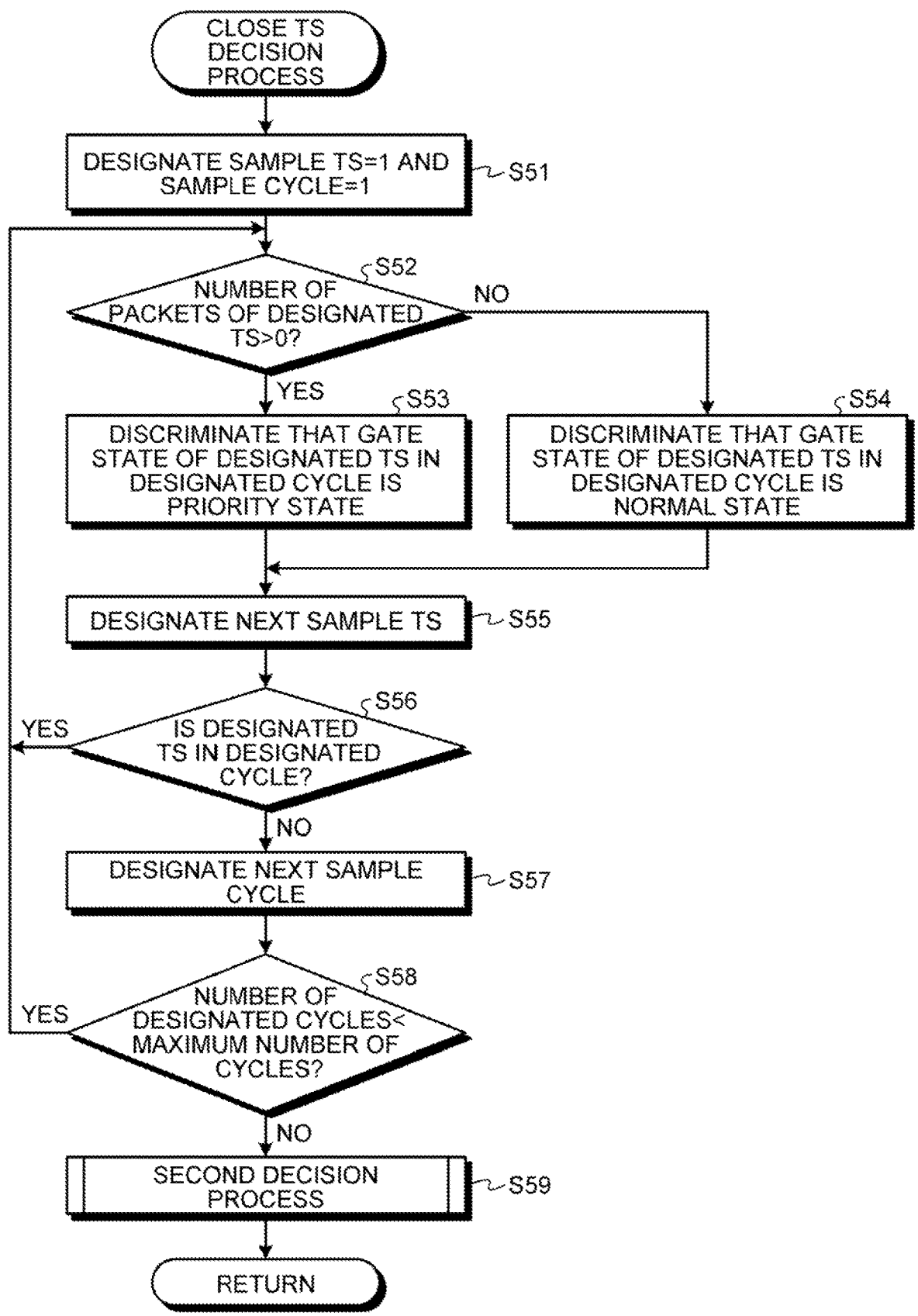
FIG. 16 is a diagram illustrating an example of the flow of the processing operation performed by the setting unit related to the close TS decision process according to the third embodiment.

FIG. 16 is a diagram illustrating an example of the flow of the processing operation performed by the setting unit 282A related to the close TS decision process according to the third embodiment. Furthermore, for convenience of description, a description will be given with the assumption that the sample cycles are "3" and the sample TSs in the sample cycle are "1" to "100". In FIG. 16, the setting unit 282A designates "1" as the sample cycle and "1" as the sample TS (Step S51). The setting unit 282A determines whether the number of packets in the designated TSs exceeds "0" (Step S52).

When the number of packets of the MPH packets in the designated TS exceeds "0" (Yes at Step S52), the setting unit 282A determines that the MPH packets are present at the timing of the designated TS and discriminates that the gate state of the designated TS in the designated cycle is the priority state (Step S53). Namely, the setting unit 282A discriminates that the gate state of the second gate 22B in the designated TS is the closed state (C). Furthermore, when the number of packets of the MFH packets in the designated TS does not exceed "0" (No at Step S52), the setting unit 282A determines that the MPH packet is not present at the timing of the designated TS and discriminates that the gate state of the designated TS in the designated cycle is the normal state (Step S54). Namely, the setting unit 282A discriminates that the gate state of the second gate 22B in the designated TS is the open state (O).

After the setting unit 282A discriminates the gate state of the designated TS in the designated cycle, the setting unit 282A designates the next sample TS (Step S55). After the setting unit 282A designates the next sample TS, the setting unit 282A determines whether the current designated TS is in the designated cycle (Step S56).

When the current designated TS is in the designated cycle (Yes at Step S56), the setting unit 282A proceeds to Step S52 in order to determine whether the number of packets of the MPH packets in the current designated TS exceeds "0". Furthermore, when the current designated TS is not in the designated cycle (No at Step S56), the setting unit 282A designates the next sample cycle (Step S57) and determine whether the number of designated cycles is less than the maximum number of cycles (Step S58).

When the number of designated cycles is less than the maximum number of cycles (Yes at Step S58), the setting unit 282A proceeds to Step S52 in order to determine whether the number of packets of the MFH packets in the designated TS exceeds "0". Furthermore, when the number of designated cycles is not less than the maximum number of cycles (No at Step S58), the setting unit 282A performs a second decision process that will be described later (Step S59) and ends the close TS decision process.

When the number of packets of the MPH packets in the designated TS for each designated cycle does not exceed "0", the setting unit 282A discriminates that the gate state of the designated TS in the designated cycle is the normal state. When the number of packets of the MPH packets in the designated TS for each designated cycle exceeds "0", the setting unit 282A discriminates that the gate state of the designated TS in the designated cycle is the priority state. Consequently, the setting unit 282A discriminates the gate state of the designated TS for each of the plurality of continuous designated cycles.

Figure 17:
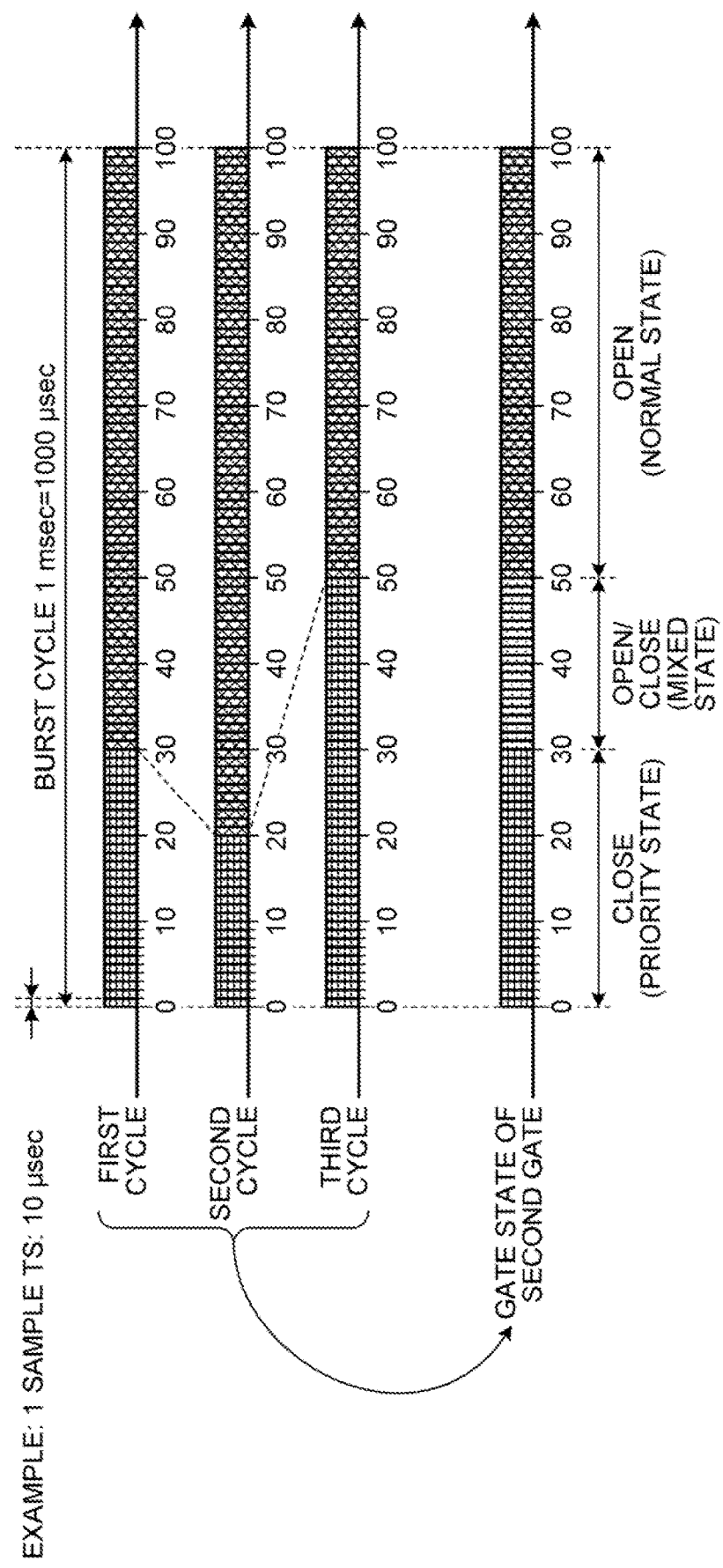
FIG. 17 is a diagram illustrating an example of the flow of the processing operation performed by the setting unit related to the second decision process.

FIG. 17 is a diagram illustrating an example of the flow of the processing operation performed by the setting unit 282A related to the second decision process. Furthermore, for convenience of description, it is assumed that, in the setting unit 282A, for example, the sample cycles are 3 cycles and the sample TSs are 100 TSs ("1" to "100").

The setting unit 282A discriminates that the gate state of the second gate 22B of the designated TSs "1" to "30" in the first cycle is the closed state, i.e., discriminates that the gate state of each of the first gate 22A and the second gate 22B is the priority state. The setting unit 282A discriminates that the gate state of the second gate 22B of the designated TSs "31" to "100" in the first cycle is the open state, i.e., discriminates that the gate state of each of the first gate 22A and the second gate 22B is the normal state.

The setting unit 282A discriminates that the gate state of the second gate 22B of the designated TSs "1" to "20" in the second cycle is the closed state, i.e., discriminates that the gate state of each of the first gate 22A and the second gate 22B is the priority state. The setting unit 282A discriminates that the gate state of the second gate 22B of the designated TSs "21" to "100" in the second cycle is the open state, i.e., discriminates that the gate state of the first gate 22A and the second gate 22B is the normal state.

The setting unit 282A discriminates that the gate state of the second gate 22B of the designated TSs "1" to "50" in the third cycle is the closed state, i.e., discriminates that the gate state of each of the first gate 22A and the second gate 22B is the priority state. The setting unit 282A discriminates that the gate state of the second gate 22B of the designated TSs "51" to "100" in the third cycle is the open state, i.e., discriminates that the gate state of each of the first gate 22A and the second gate 22B is the normal state.

Figure 18:
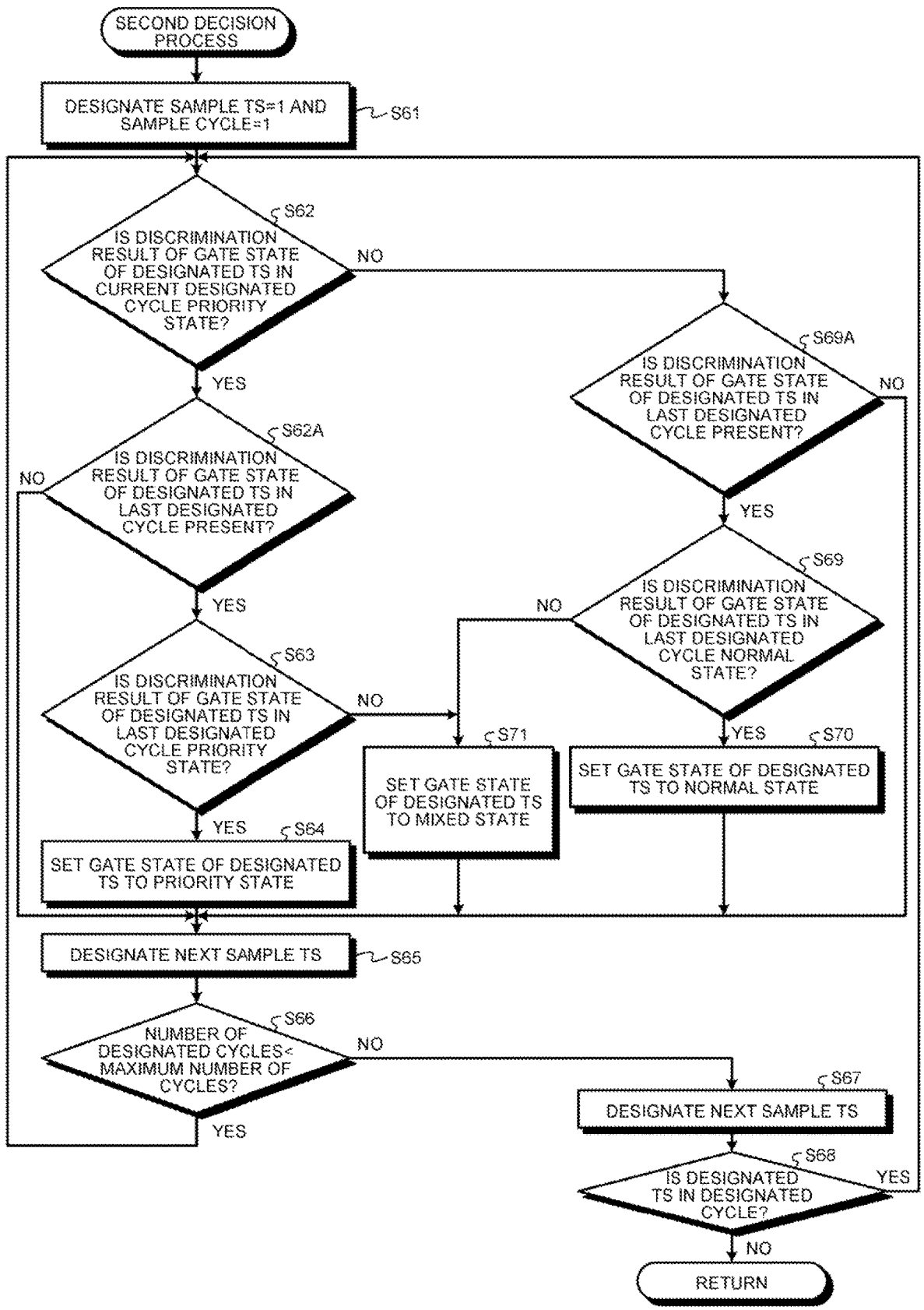
FIG. 18 is a diagram illustrating an example of the flow of the processing operation performed by the setting unit related to the second decision process.

FIG. 18 is a diagram illustrating an example of the flow of the processing operation performed by the setting unit 282A related to the second decision process. The setting unit 282A designates "1" as the sample cycle and "1" as the sample TS (Step S61). The setting unit 282A determines whether the discrimination result of the gate state of the designated TS in the current designated cycle is the priority state (Step S62). When the discrimination result of the gate state of the designated TS in the current designated cycle is the priority state (Yes at Step S62), the setting unit 282A determines whether the discrimination result of the gate state of the designated TS in the last designated cycle is present (Step S62A). When the discrimination result of the gate state of the designated TS in the last designated cycle is present (Yes at Step S62), the setting unit 282A determines whether the discrimination result of the gate state of the designated TS in the last designated cycle is the priority state (Step S63).

When the discrimination result of the gate state of the designated TS in the last designated cycle is the priority state (Yes at Step S63), the setting unit 282A sets the gate state of the designated TS to the priority state (Step S64). Namely, when the discrimination result of the gate states of a plurality of the same designated TSs in the designated cycles are the priority state in the previous and next designated cycles, the setting unit 282A sets the gate state of the subject designated TSs to the priority state. Namely, the setting unit 282A sets the gate state of the second gate 22B of the designated TSs to the closed state. For example, the setting unit 282A sets the gate state of the second gate 22B of the TSs "1" to "30" illustrated in FIG. 17 to the closed state.

The setting unit 282A designates the next sample cycle (Step S65), and determines whether the number of designated cycles is less than the maximum number of cycles (Step S66). When the number of designated cycles is not less than the maximum number of cycles (No at Step S66), the setting unit 282A designates the next sample TS (Step S67). Furthermore, the setting unit 282A determines whether the designated TS is in the designated cycle (Step S68). When the designated TS is in the designated cycle (Yes at Step S68), the setting unit 282A proceeds to Step S62 in order to determine whether the discrimination result of the gate state of the designated TS in the designated cycle is the priority state. When the number of designated cycles is less than the maximum number of cycles (Yes at Step S66), the setting unit 282A proceeds to Step S62 in order to determine whether the discrimination result of the gate state of the designated TS in the designated cycle is the priority state.

When the discrimination result of the gate state of the designated TS in the current designated cycle is not the priority state (No at Step S62), the setting unit 282A determines that the discrimination result of the gate state of the designated TS in the current designated cycle is the normal state. Furthermore, when the setting unit 282A determines that the discrimination result of the gate state of the designated TS is the normal state, the setting unit 282A determines whether the discrimination result of the gate state of the designated TS in the last designated cycle is present (Step S69A). When the discrimination result of the gate state of the designated TS in the last designated cycle is present (Yes at Step S69A), the setting unit 282A determines whether the discrimination result of the gate state of the designated TS in the last designated cycle is the normal state (Step S69). When the discrimination result of the gate state of the designated TS in the last designated cycle is the normal state (Yes at Step S69), the setting unit 282A sets the gate state of the designated TS to the normal state (Step S70), and proceeds to Step S65 in order to designates the next sample cycle. Namely, when the discrimination result of the gate state of a plurality of the same designated TSs in the designated cycle is the normal state in the previous and the next designated cycles, the setting unit 282A sets the gate state of the subject designated TSs to the normal state. Namely, the setting unit 282A sets the gate state of the second gate 22B of the designated TS to the open state. For example, the setting unit 282A sets the gate state of the second gate 22B of the TSs "51" to "100" illustrated in FIG. 17 to the open state.

Furthermore, when the discrimination result of the gate state of the designated TS in the last designated cycle is not the normal state (No at Step S69), the setting unit 282A sets the gate state of the designated TS to the mixed state (Step S71), and proceeds to Step S65 in order to designates the nest sample cycle. Furthermore, when the gate state of the designated TS in the last designated cycle is not the priority state (No at Step S63), the setting unit 282A proceeds to Step S71 in order to set the gate state of the designated TS to the mixed state. Namely, when the gate states of a plurality of the same designated TSs in the designated cycle are different between the previous and the next designated cycles, the setting unit 282A sets the gate state of the subject designated TSs to the mixed state. Namely, the setting unit 282A sets the gate state of the second gate 22B of the designated TS to the open/closed state. For example, the setting unit 282A sets the gate state of the second gate 22B of the TSs "31" to "50" illustrated in FIG. 18 to the open/closed state.

Furthermore, when the gate state of the designated TS in the last designated cycle is not present (No at Step S62A), the setting unit 282A proceeds to Step S65 in order to designate the next sample cycle. Furthermore, when the gate state of the designated TS in the last designated cycle is not present (No at Step S69A), the setting unit 282A proceeds to Step S65.

When the discrimination result of the gate state of the same designated TSs in the previous and the next designated cycles is the priority state, the setting unit 282A sets the gate state of the subject designated TSs to the priority state. Namely, the setting unit 282A sets the gate state of the second gate 22B in the designated TS to the closed state.

When the discrimination result of the gate state of the same designated TSs in the previous and the next designated cycles is the normal state, the setting unit 282A sets the gate state of the subject designated TSs to the normal state. Namely, the setting unit 282A sets the gate state of the second gate 22B of the designated TS to the open state.

When the gate states of the same designated TSs in the previous and the next designated cycles are different, the setting unit 282A sets the gate state of the subject designated TSs to the mixed state. Namely, the setting unit 28A sets the gate state of the second gate 22B of the designated TSs to the open/closed state.

The packet processing apparatus 5 according to the third embodiment sets, when all of the discrimination results of the gate states of the same designated TSs in the continuous sample cycles are the priority state, the gate states of the subject designated TSs to the priority state. Furthermore, when all of the discrimination results of the gate states of the same designated TSs in the continuous sample cycles are the normal state, the packet processing apparatus 5 sets the gate state of the subject designated TSs to the normal state. Furthermore, when the discrimination results of the gate states of a plurality of the same designated TSs in the continuous sample cycles are different, the packet processing apparatus 5 sets the gate state of the subject designated TSs to the mixed state. Even when fluctuation in which the discrimination result of the gate state for each of the same TSs is changed between the continuous sample cycles occurs, it is possible to set the gate state for each TS.

[d] Fourth Embodiment

Figure 19:
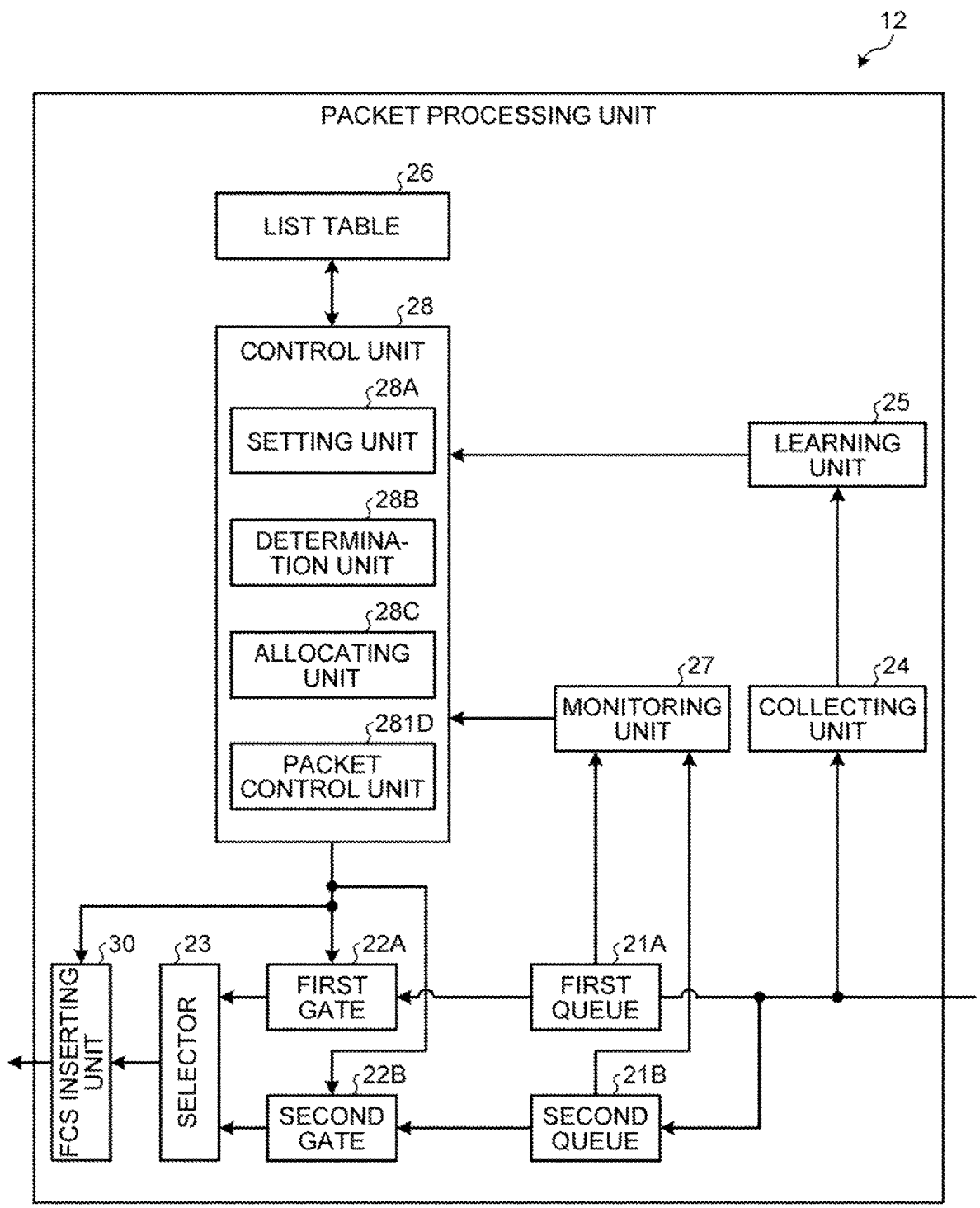
FIG. 19 is a diagram illustrating an example of a configuration of a packet processing unit according to a fourth embodiment.

FIG. 19 is a diagram illustrating an example of a configuration of the packet processing unit 12 according to a fourth embodiment. Furthermore, by assigning the same reference numerals to components having the same configuration as those in the first embodiment, overlapped descriptions of the configuration and the operation thereof will be omitted. The packet processing unit 12 illustrated in FIG. 19 includes an FCS inserting unit 30. Furthermore, in the packet processing unit 12 according to the fourth embodiment, a packet control unit 281D is arranged instead of the packet control unit 28 according to the first embodiment.

When the gate state of the designated TS is the mixed state and when an amount of output delay of the MFH packets is within an allowable amount, the packet control unit 281D copies non-MFH packets into the second queue 21B in units of packets and outputs the subject non-MFH packets from the second gate 22B. Furthermore, after having output the non-MFH packets, the packet control unit 281D deletes the copied non-MFH packets from the second queue 21B.

When the gate state in the designated TS is the mixed state and when an amount of output delay of the MPH packets exceeds the allowable amount in the course of outputting the non-MFH packets, the packet control unit 281D controls the FCS inserting unit 30 in order to add an FCS error to the non-MFH packets that are being output. Furthermore, the packet control unit 281D outputs the non-MPH packets to which the FCS error is added from the second gate 22B, stops the remaining output of the subject non-MFH packets, and discards the non-MPH packets. Then, when the gate state is switched to the normal state next time, the packet control unit 281D outputs the non-MFH packets that are copied into the second queue 21B from the second gate 22B.

In the receiving device that is arranged on the destination side and that receives the non-MPH packets from the packet processing apparatus 5, when the receiving device receives the non-MPH packets, the receiving device extracts an FCS error in the received non-MPH packets and discards the subject non-MPH packets.

Figure 20:
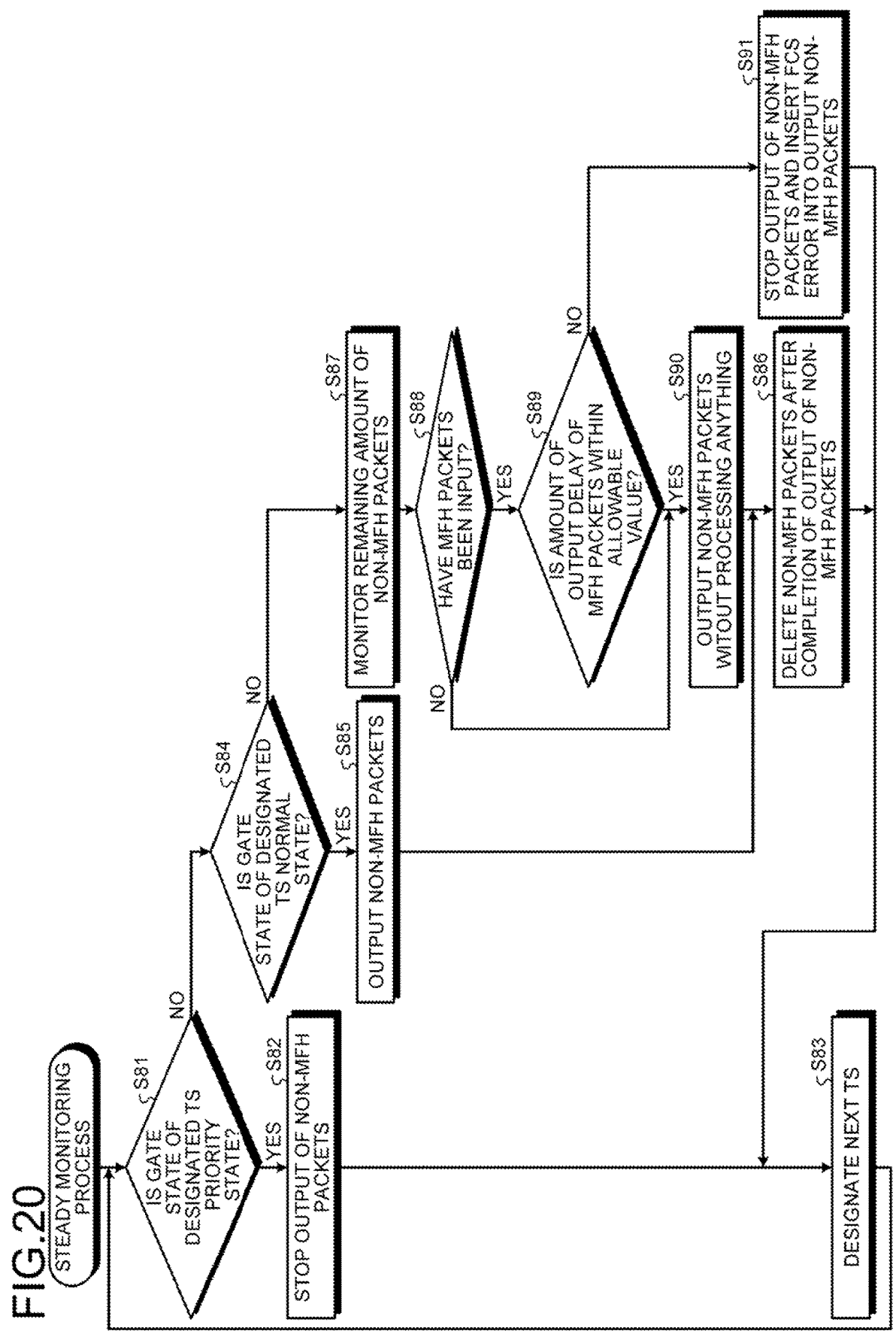
FIG. 20 is a diagram illustrating an example of the flow of the processing operation performed by a packet control unit related to a steady monitoring process according to a fourth embodiment.

FIG. 20 is a diagram illustrating an example of the flow of the processing operation performed by the packet control unit 281D related to the steady monitoring process according to a fourth embodiment. The packet control unit 281D determines whether the gate state of the designated TS is the priority state (Step S81). When the gate state of the designated TS is the priority state (Yes at Step S81), the packet control unit 281D stops output of the non-MPH packets (Step S82). Furthermore, the gate state at Step S82 is the priority state in which the gate state of the first gate 22A is always the open state and the gate state of the second gate 22B is the closed state.

After having stopped the output of the non-MFH packets at Step S82, the packet control unit 281D designates the next TS (Step S83) and proceeds to Step S81 in order to determine whether the gate state of the designated TS is the priority state. When the gate state of the designated TS is not the priority state (No at Step S81), the packet control unit 281D determines whether the gate state of the designated TS is the normal state (Step S84). When the gate state of the designated TS is the normal state (Yes at Step S84), the packet control unit 281D outputs the non-MFH packets (Step S85). Furthermore, the packet control unit 281D deletes the non-MFH packet from the second queue 21B after the completion of output of the non-MFH packets (Step S86), and proceeds to Step S83 in order to designates the next TS. Furthermore, the gate state at Step S84 is the normal state in which the first gate 22A is always in the open state and the second gate 22B is in the open state. Furthermore, the normal state is the state in which the MFH packets can also be output but does not flow in the cyclic pattern of the MFH packets.

When the gate state of the designated TS is not the normal state (No at Step S84), the packet control unit 281D determines that the gate state of the designated TS is the mixed state and monitors the remaining amount of the non-MPH packets (Step S87). The packet processing unit 12 determines whether MFH packets have been input to the first queue 21A (Step S88).

When the packet control unit 281D detects an input of the MPH packets into the designated TS (Yes at Step S88), the packet control unit 281D determines, when the MPH packets and the non-MFH packets are output in the designated TS, whether an amount of output delay of the MPH packets is within the allowable value (Step S89). When an amount of output delay of the MPH packets is within the allowable value (Yes at Step S89), the packet control unit 281D outputs the non-MFH packets (Step S90). Then, the packet control unit 281D proceeds to Step S86 in order to delete the second queue 21B after the completion of the output of the non-MFH packets. When the MPH packets are not input (No at Step S88), the packet control unit 281D proceeds to Step S90 in order to output the non-MPH packets.

When an amount of output delay of the MH packets in the designated TS is not within the allowable value (No at Step S89), the packet control unit 281D stops output of the non-MPH packets and adds an FCS error to the non-MFH packets that are in the middle of output (Step S91). Then, after having added the FCS error to the non-MH packets, the packet control unit 281D proceeds to Step S83 in order to designate the next TS. Furthermore, in the receiving device that has received the non-MFH packets to which the PCS error is added and that is provided on the destination side, when the receiving device extracts the FCS error in the non-MPH packet, the receiving device discards the non-MPH packet.

When the gate state of the designated TS is the priority state, the packet control unit 281D stops output of the non-MPH packets and outputs the MPH packets with priority. Consequently, the packet control unit 281D can suppress the output delay of the MPH packets.

When the gate state of the designated TS is the normal state, the packet control unit 281D alternatively outputs the non-MPH packets or the MPH packets. Consequently, the packet control unit 281D can suppress the output delay of the non-MPH packets.

When the gate state of the designated TS is the mixed state and when an amount of output delay of the MPH packets in the designated TS is within the allowable value, the packet control unit 281D outputs the MPH packets and the non-MPH packets. Consequently, the packet control unit 281D can suppress the output delay of the MPH packets and the non-MFH packets.

When the gate state of the designated TS is the mixed state and when an amount of output delay of the MPH packets in the designated TS exceeds the allowable value, the packet control unit 281D adds the FCS error to the non-MPH packets that are in the middle of output, outputs the non-MFH packets, and then stops output of the remaining non-MFH packets. Furthermore, the packet control unit 281D outputs the MPH packets with priority. Consequently, the packet control unit 281D can output the MPH packets with priority while notifying the receiving device on the destination side of the presence of the non-MPH packets that are in the middle of output.

When the gate state of the designated TS is the mixed state and when an amount of output delay of the MPH packets in the designated TS is the allowable value, the packet processing apparatus 5 according to the fourth embodiment outputs the MPH packets and the non-MPH packets. Consequently, the packet processing apparatus 5 can suppress the output delay of the MPH packets and the non-MPH packets.

When the gate state of the designated TS is the mixed state and when an amount of output delay of the MPH packets in the designated TS exceeds the allowable value, the packet processing apparatus 5 adds the PCS error to the non-MFH packets that are in the middle of output, outputs the non-MPH packets, and then stops an output of the non-MPH packets. Furthermore, the packet processing apparatus 5 outputs the MPH packets with priority. Consequently, the packet processing apparatus 5 can output the MPH packets with priority while notifying the receiving device on the destination side of the presence of the non-MPH packets that are in the middle of output.

[e] Fifth Embodiment

Figure 21:
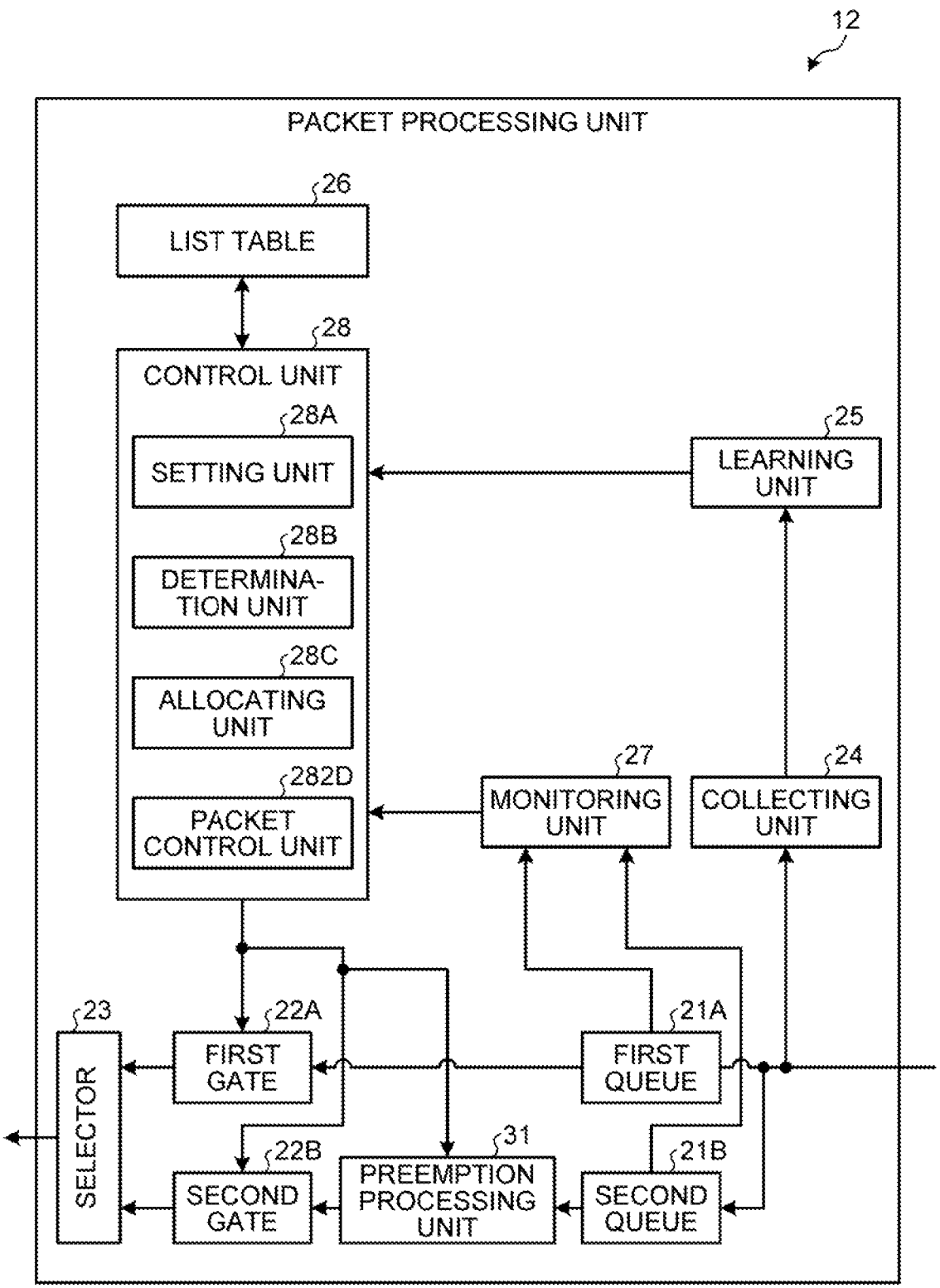
FIG. 21 is a diagram illustrating an example of a configuration of a packet processing unit according to a fifth embodiment.

FIG. 21 is a diagram illustrating an example of a configuration of the packet processing unit 12 according to a fifth embodiment. Furthermore, by assigning the same reference numerals to components having the same configuration as those in the first embodiment, overlapped descriptions of the configuration and the operation thereof will be omitted. The packet processing unit 12 illustrated in FIG. 21 includes a preemption processing unit 31 that is arranged between the second queue 21B and the second gate 22B. When the preemption processing unit 31 stops output of a non-MFH packet in the middle of output, the preemption processing unit 31 divides the non-MPH packet into a divided packet on the front side and divided packet on the back side. The preemption processing unit 31 adds an identifier for identifying the divided packet to the end of the divided packet on the front side, and outputs the packet from the second gate 22B. Furthermore, the preemption processing unit 31 adds an identifier for identifying the divided packet to the top of the divided packet on the back side. Then, when the gate state has been switched to the normal state, the preemption processing unit 31 outputs the divided packet on the back side that is being held from the second gate 22B. Furthermore, in the packet processing unit 12 according to the fifth embodiment, a packet control unit 282D is arranged instead of the packet control unit 28D according to the first embodiment.

When the gate state of the designated TS is the mixed state and when an amount of output delay of the MFH packets is within the allowable amount, the packet control unit 282D copies the non-MPH packets into the second queue 21B in units of packets and outputs the subject non-MPH packets from the second gate 22B. After having output the subject non-MPH packets, the packet control unit 282D deletes the copied non-MFH packets from the second queue 21B.

When the gate state of the designated TS is the mixed state and when an amount of output delay of the MPH packets exceeds the allowable amount in the course of outputting the non-MPH packet, the packet control unit 282D performs a preemption process on the non-MPH packets that are being output. The packet control unit 282D controls the preemption processing unit 31 in order to perform the preemption process. The preemption processing unit 31 divides a non-MFH packet into a divided packet on the front side and a divided packet on the back side, adds an identifier for identifying the divided packets to the end of the divided packet on the front side, and adds the identifier to the top of the divided packet on the back side packet.

The preemption processing unit 31 adds the identifier to the end of the divided packet on the front side, outputs the divided packet on the front side from the second gate 22B, adds the identifier to the top of the divided packet on the back side, and holds the divided packet on the back side. Then, when the gate state is switched to the normal state next time, the packet control unit 282D outputs the held divided packet on the back side from the second gate 22B.

When the receiving device on the destination side receives the divided packet on the front side and the divided packet on the back side, and when the identifiers in the divided packets on each of the front side and the back side are the same, the receiving device combines the divided packet on the front side and the divided packet on the back side.

Figure 22:
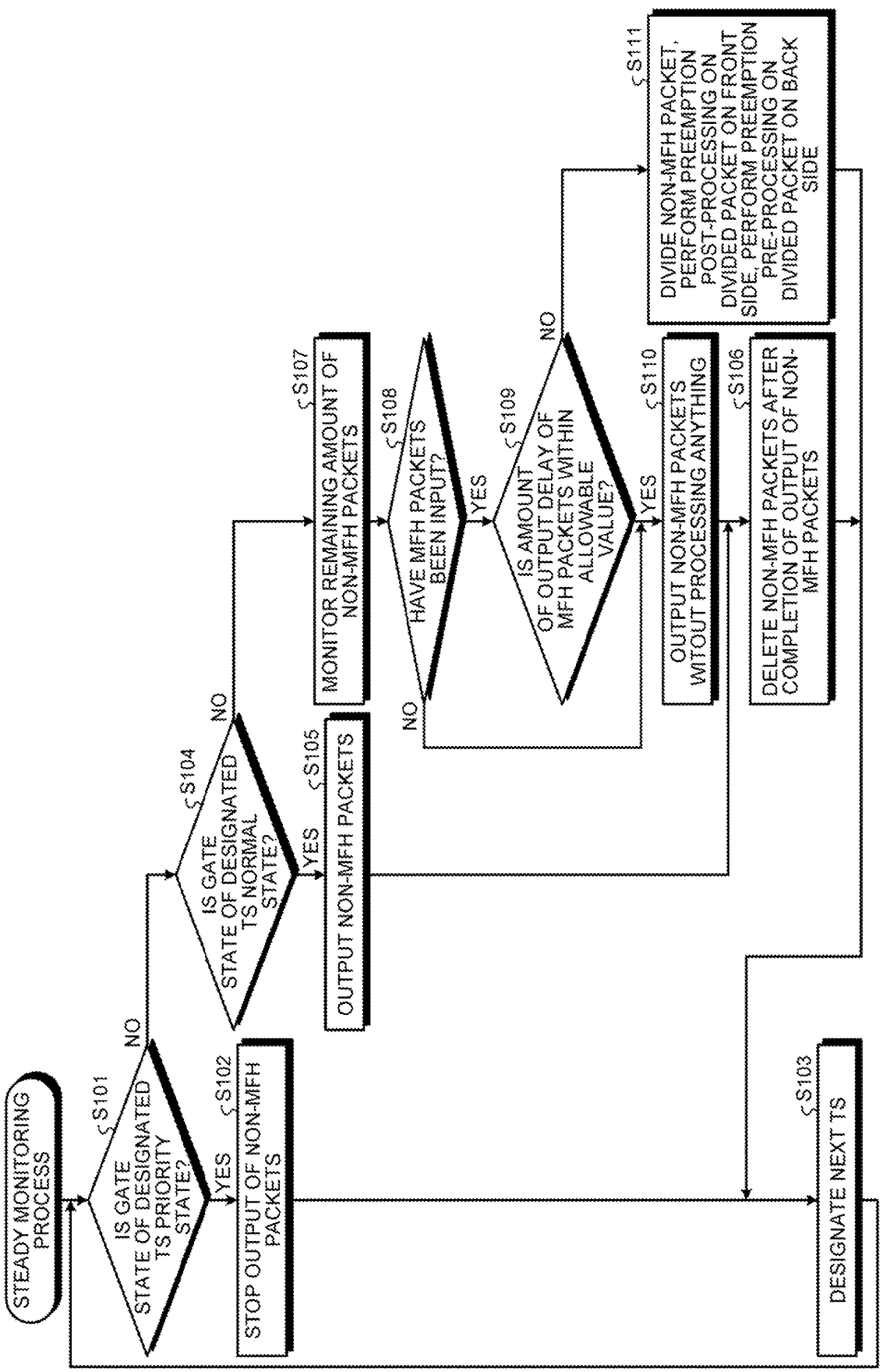
FIG. 22 is a diagram illustrating an example of the flow of the processing operation performed by a packet control unit related to a steady monitoring process according to the fifth embodiment.

FIG. 22 is a diagram illustrating an example of the flow of the processing operation performed by the packet control unit 282D related to a steady monitoring process according to the fifth embodiment. The packet control unit 282D determines whether the gate state of the designated TS is the priority state (Step S101). When the gate state of the designated TS is the priority state (Yes at Step S101), the packet control unit 282D stops output of the non-MPH packets (Step S102). Furthermore, the gate state at Step S102 is the priority state in which the first gate 22A is always in the open state and the second gate 22B is in the closed state.

After having stopped the output of the non-MPH packets at Step S102, the packet control unit 282D designates the next TS (Step S103), and proceeds to Step S101 in order to determine whether the gate state of the designated TS is the priority state. When the gate state of the designated TS is not the priority state (No at Step S101), the packet control unit 282D determines whether the gate state of the designated TS is the normal state (Step S104). When the gate state of the designated TS is the normal state (Yes at Step S104), the packet control unit 282D outputs the non-MFH packets (Step S105). Furthermore, the packet control unit 282D deletes the non-MPH packets from the second queue 21B after the completion of output of the non-MPH packets (Step S106), and proceeds to Step S103 in order to designate the next TS. Furthermore, the gate state at Step S104 is the normal state in which the first gate 22A is always in the open state and the second gate 22B is in the open state. Furthermore, the normal state is the state in which the MPH packets can also be output but does not flow in the cyclic pattern of the MH packets.

When the gate state of the designated TS is not the normal state (No at Step S104), the packet control unit 282D determines that the gate state of the designated TS is the mixed state and monitors the remaining amount of the non-MFH packets (Step S107). The packet control unit 282D determines whether the MPH packets have been input to the first queue 21A (Step S108).

When the packet control unit 282D detects an input of the MPH packets of the designated TS (Yes at Step S108), the packet control unit 282D determines, when the MPH packets and the non-MPH packets are output in the designated TS, whether an amount of output delay of the MPH packets is within the allowable value (Step S109). When an amount of output delay of the MH packets in the designated TS is within the allowable value (Yes at Step S109), the packet control unit 282D outputs the non-MFH packets (Step S110). Furthermore, the packet control unit 282D proceeds to Step S106 in order to delete the non-MPH packets from the second queue 21B after the completion of the output of the non-MPH packets. When the MPH packets are not input (No at Step S108), the packet control unit 282D proceeds to Step S110 in order to output the non-MFH packets.

When an amount of output delay of the MFH packets in the designated TS is not within the allowable value (No at Step S109, the packet control unit 282D performs the preemption process on the non-MFH packets (Step S111), and proceeds to Step S103 in order to designate the next TS. Furthermore, the preemption processing unit 31 divides a non-MPH packet into a divided packet on the front side and a divided packet on the back side. At this time, the preemption processing unit 31 performs post-processing of adding an identifier to the end of the divided packet on the front side that is in the middle of output and performs pre-processing of adding an identifier to the top of the divided packet on the back side that has not been output. Furthermore, the preemption processing unit 31 outputs the divided packet on the front side that is in the middle of output from the second gate 22B and holds the divided packet on the back side that has not been output.

When the gate state of the designated TS is the priority state, the packet control unit 282D stops output of the non-MFH packet, and then outputs the MFH packets with priority. Consequently, the packet control unit 282D can suppress the output delay of the MH packets.

When the gate state of the designated TS is the normal state, the packet control unit 282D alternatively outputs the non-MFH packets or the MFH packets. Consequently, the packet control unit 282D can suppress the output delay of the non-MPH packets.

When the gate state of the designated TS is the mixed state and when an amount of output delay of the MPH packets in the designated TS is the allowable value, the packet control unit 282D outputs the MPH packets and the non-MFH packets. Consequently, the packet control unit 282D can suppress output delay of the MFH packets and the non-MFH packets.

When the gate state of the designated TS is the mixed state and when an amount of output delay of the MPH packets in the designated TS exceeds the allowable value, the packet control unit 282D performs the preemption process on the non-MPH packets that is in the middle of output. The preemption processing unit 31 divides a non-MPH packet into a divided packet on the front side and a divided packet on the back side. The preemption processing unit 31 performs post-processing of adding an identifier to the end of the divided packet on the front side that is in the middle of output and performs pre-processing of adding an identifier to the top of the divided packet on the back side that has not been output. Furthermore, the preemption processing unit 31 outputs the divided packet on the front side that is in the middle of output from the second gate 22B and holds the divided packet on the back side that has not been output. Then, the packet control unit 282D outputs the MPH packet with priority. Consequently, the packet control unit 282D can output the MPH packet with priority while notifying the receiving device on the destination side of the presence of the non-MPH packet that is in the middle of output.

When the gate state of the designated TS is the mixed state and when an amount of output delay of the MPH packets in the designated TS is within the allowable value, The packet processing apparatus 5 according to the fifth embodiment outputs the MPH packets and the non-MPH packets. Consequently, the packet processing apparatus 5 can suppress the output delay of the MPH packets and the non-MPH packets.

When the gate state of the designated TS is the mixed state and when an amount of output delay of the MPH packets in the designated TS exceeds the allowable value, the packet processing apparatus 5 performs the preemption process on the non-MPH packets that is in the middle of output. Furthermore, the packet processing apparatus 5 outputs the MPH packets with priority. Consequently, the packet processing apparatus 5 can output the MPH packets with priority while notifying the receiving device on the destination side of the presence of the non-MFH packets that is in the middle of output.

In the embodiments described above, two types of packets assuming that an MPH packet is a high priority packet and a non-MFH packet is a low priority packet are used; however, the number of types is not limited to two and may also be appropriately changed. For example, when three types of priority levels are used for the packets, it is assumed that three gates are arranged setting states of the respective gates is stored in the list table 26.

In the embodiments described above, a description has been given with the assumption that the duration of the subframe associated with, for example, 5G radio signal is 1 ms; however, the duration is not limited to this and may also be appropriately changed.

In the embodiments described above, the collecting unit 24, the learning unit 25, the list table 26, the monitoring unit 27, and the control unit 28 are arranged in the packet processing unit 12. However, for example, the collecting unit 24, the learning unit 25, the list table 26, the monitoring unit 27, and the control unit 28 may also be arranged in the CPU 15 and may also be appropriately changed.

In the embodiments described above, the packet processing apparatus 5 in MFH has been exemplified; however, the packet processing apparatus 5 is not limited to wireless communication mobile apparatuses. For example, in the field other than the field of mobile communication, the packet processing apparatus 5 can be used for a low delay process using TAS as a packet processing apparatus connected to Ethernet (registered trademark) in a factory. In addition to the terminal devices that are connected to a distributed station via wireless communication, wire communication can be used for a connection and the connection may also be appropriately changed.

Each of the components in the units illustrated in the drawings is not always physically configured as illustrated in the drawings. In other words, the specific shape of a separate or integrated unit is not limited to the drawings; however, all or part of the unit can be configured by functionally or physically separating or integrating any of the units depending on various kinds of loads or use conditions.

Furthermore, all or any part of various processing functions performed by each unit may also be executed by a CPU (or a microcomputer, such as an MPU, a micro controller unit (MCU), or the like). Furthermore, all or any part of various processing functions may also be, of course, executed by programs analyzed and executed by the CPU (or the microcomputer, such as the MPU or the MCU), or executed by hardware by wired logic.

According to an aspect of an embodiment, it is possible to suppress output delays of high priority packets and low priority packets.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A packet processing apparatus that connects a distributed station and a central station by a wired communication, the packet processing apparatus comprising:
    a first gate that opens and closes output of a first packet in which low delay is requested as compared to a second packet in the wired communication, with respect to the wired communication for each of the time slots in a subframe;
    a second gate that opens and closes output of the second packet with respect to the wired communication for each of the time slots in the subframe; and
    a processor configured to:
    learn, from a flow rate of the first packet, a cyclic pattern of the first packet for each of the time slots in the subframe in a predetermined cycle;
    set, for each of the time slots as a gate state of each of the first gate and the second gate, a priority state in which the first packet is output with priority, a normal state in which the first packet or the second packet is alternatively output, or a mixed state in which the normal state and the priority state are present in a mixed manner, and set, as a gate state of a predetermined time slot associated with the cyclic pattern, the priority state or the mixed state;
    monitor a flow rate of each of the first packet and the second packet in the predetermined time slot that is set in the mixed state;
    determine, from a monitoring result obtained from the monitoring, whether an amount of output delay of the first packet at the time of outputting the first packet and the second packet in the predetermined time slot is within an allowable amount;
    allocate, when the amount of output delay of the first packet is within the allowable amount, the first packet and the second packet to the predetermined time slot; and
    control the setting so as to set the gate state at output timing of the first packet allocated in the predetermined time slot to the priority state and set the gate state at output timing of the second packet allocated in the predetermined time slot to the normal state.

2. The packet processing apparatus according to claim 1, wherein the setting includes:
    measuring a flow rate of the first packet in a designated time slot for each of the predetermined cycles;
    discriminating,
        when there is no flow rate of the first packet in the designated time slot, that the gate state of the designated time slot is the normal state,
        when there is a flow rate of the first packet and when the flow rate of the first packet is greater than or equal to a predetermined threshold, that the gate state of the designated time slot is the priority state, and
        when there is the flow rate of the first packet and the flow rate of the first packet is less than the predetermined threshold, that the gate state of the designated time slot is the mixed state; and
    setting,
        when it is discriminated that the gate state of the designated time slot is the priority state during the predetermined cycle, the gate state of the designated time slot to the priority state, when it is discriminated that the gate state of the designated time slot is the mixed state during the predetermined cycle, the gate state of the designated time slot to the mixed state, or when it is discriminated that the gate state of the designated time slot is continuously the normal state across the predetermined cycles, the gate state of the designated time slot to the normal state.

3. The packet processing apparatus according to claim 1, wherein the setting includes:

measuring a flow rate of the first packet in a designated time slot for each of the predetermined cycles, discriminating, when there is no flow rate of the first packet in the designated time slot, that a gate state of the designated time slot is the normal state, and when there is a flow rate of the first packet, that the gate state of the designated time slot is the priority state, and setting, when it is discriminated that the gate state of the designated time slot is continuously the normal state across the predetermined cycles, the gate state of the designated time slot to the normal state, when it is discriminated that the gate state of the designated time slot is continuously priority state across the predetermined cycles, the gate state of the designated time slot to the priority state, or when it is discriminated that the gate states of the designated time slots are different across the predetermined cycles, the gate state of the designated time slot to the mixed state.

4. The packet processing apparatus according to claim 1, wherein the controlling includes:

copying, when the gate state of the predetermined time slot is the mixed state and when the amount of output delay of the first packet is within the allowable amount, the second packets in units of packets, outputting the second packets from the second gate, and deleting the copied second packets after the completion of the output of the second packets, and adding, when the gate state of the predetermined time slot is the mixed state and when the amount of output delay of the first packet exceeds the allowable amount during output of the second packets, error information to the second packets, outputting the second packets from the second gate, and stopping output of the remaining second packets.

5. The packet processing apparatus according to claim 1, wherein the controlling includes:

copying, when the gate state of the predetermined time slot is the mixed state and when the amount of output delay of the first packet is within the allowable amount, the second packets in units of packets, outputting the second packets from the second gate, and deleting the copied second packets after the completion of the output of the second packets, and performing, when the gate state of the predetermined time slot is the mixed state and when the amount of output delay of the first packet exceeds the allowable amount during output of the second packets, a preemption process on the second packets that are being output.

6. The packet processing apparatus according to claim 1, wherein the controlling includes:

setting, as the priority state, output of the first gate to an open state and output of the second gate to a closed state, and setting, as the normal state, output of the first gate to the open state and output of the second gate to the open state.

7. A packet processing method performed by a packet processing apparatus that connects, in wired communication, a distributed station and a central station and that comprises:

a first gate that opens and closes output of a first packet in which low delay is requested as compared to a second packet, with respect to the wired communication for each of the time slots in a subframe;

a second gate that opens and closes output of the second packet with respect to the wired communication for each of the time slots in the subframe; and a processor configured to learn, from a flow rate of the first packet, a cyclic pattern of the first packet for each of the time slot in the subframe in a predetermined cycle; and the packet processing method comprising:

setting, for each of the time slots as a gate state of each of the first gate and the second gate, a priority state in which the first packet is output with priority, a normal state in which the first packet or the second packet is alternatively output, a mixed state in which the normal state and the priority state are present in a mixed manner;

setting, as a gate state of a predetermined time slot associated with the cyclic pattern, the priority state or the mixed state;

monitoring a flow rate of each of the first packet and the second packet in the predetermined time slot that is set in the mixed state;

determining, from a monitoring result obtained at the monitoring, whether an amount of output delay of the first packet at the time of outputting the first packet and the second packet in the predetermined time slot is within an allowable amount;

allocating, when the amount of output delay of the first packet is within the allowable amount, the first packet and the second packet to the predetermined time slot; and setting the gate state at output timing of the first packet allocated in the predetermined time slot to the priority state and setting the gate state at output timing of the second packet allocated in the predetermined time slot to the normal state.

* * * * *